(12) United States Patent
Ronen et al.

(10) Patent No.: US 11,815,709 B2
(45) Date of Patent: Nov. 14, 2023

(54) OPTICAL DEVICES FOR MITIGATING GHOST IMAGES

(71) Applicant: Lumus Ltd., Ness Ziona (IL)

(72) Inventors: Eitan Ronen, Rechovot (IL); Edgar Friedmann, Sdey-Avraham (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/779,663

(22) PCT Filed: Mar. 17, 2021

(86) PCT No.: PCT/IL2021/050294
§ 371 (c)(1),
(2) Date: May 25, 2022

(87) PCT Pub. No.: WO2021/191889
PCT Pub. Date: Sep. 30, 2021

(65) Prior Publication Data
US 2022/0357497 A1    Nov. 10, 2022

Related U.S. Application Data

(60) Provisional application No. 62/993,100, filed on Mar. 23, 2020.

(51) Int. Cl.
*G02B 6/00* (2006.01)
*G02B 6/34* (2006.01)
(Continued)

(52) U.S. Cl.
CPC ........ *G02B 6/0031* (2013.01); *G02B 27/0172* (2013.01)

(58) Field of Classification Search
CPC .... G02B 6/0031; G02B 27/0172; G02B 6/00; G02B 6/24
(Continued)

(56) References Cited

U.S. PATENT DOCUMENTS 10,078,222 B2    9/2018    Komatsu et al.
2013/0070344 A1    3/2013    Takeda
(Continued)

FOREIGN PATENT DOCUMENTS

WO    20200044198    3/2020
WO    2021051068    9/2021

*Primary Examiner* — Kaveh C Kianni
*Assistant Examiner* — Hung Q Lam
(74) *Attorney, Agent, or Firm* — Mark M. Friedman

(57) ABSTRACT

An optical device has a light-transmitting substrate, an optical coupling-out configuration, and an optical arrangement. The light-transmitting substrate has at least two major surfaces and guides light by internal reflection between the major surfaces. The optical coupling-out configuration couples the light, guided by internal reflection, out of the light-transmitting substrate toward an eye of a viewer. The optical arrangement is associated with at least one of the two major surfaces, and has a first optical element and a second optical element. The optical elements are optically coupled to each other to define an interface region associated with at least a portion of the coupling-out configuration. The interface region deflects light rays that emanate from an external scene that are incident to the optical arrangement at a given range of incident angles.

20 Claims, 15 Drawing Sheets

(51) Int. Cl.
   *G02B 6/10*   (2006.01)
   *F21V 8/00*   (2006.01)
   *G02B 27/01*  (2006.01)

(58) Field of Classification Search
   USPC .................................. 385/37, 147, 129–131
   See application file for complete search history.

(56) References Cited

U.S. PATENT DOCUMENTS

| | | |
|---|---|---|
| 2015/0019398 A1 | 7/2015 | Zeev et al. |
| 2015/0235421 A1 | 8/2015 | Schowengerdt |
| 2015/0235473 A1 | 8/2015 | Schowengerdt |
| 2015/0243091 A1 | 8/2015 | Schowengerdt |
| 2015/0309316 A1 | 10/2015 | Osterhout et al. |
| 2016/0207457 A1 | 7/2016 | Border et al. |
| 2016/0024731 A1 | 8/2016 | Nowatzyk et al. |
| 2017/0235142 A1 | 8/2017 | Wall et al. |
| 2017/0293141 A1* | 10/2017 | Schowengerdt ... G02B 27/0101 |
| 2018/0284447 A1 | 10/2018 | Matsuki et al. |
| 2020/0103650 A1 | 4/2020 | Woods |
| 2020/0292818 A1 | 9/2020 | Amitai et al. |
| 2021/0055555 A1* | 2/2021 | Chi ..................... G02B 6/0026 |
| 2021/0173480 A1 | 6/2021 | Osterhout |
| 2021/0231951 A1 | 7/2021 | Dominguez et al. |
| 2021/0239898 A1 | 8/2021 | Danziger et al. |
| 2021/0271006 A1 | 9/2021 | Ronen et al. |
| 2021/0271084 A1 | 9/2021 | Tanaka |

\* cited by examiner

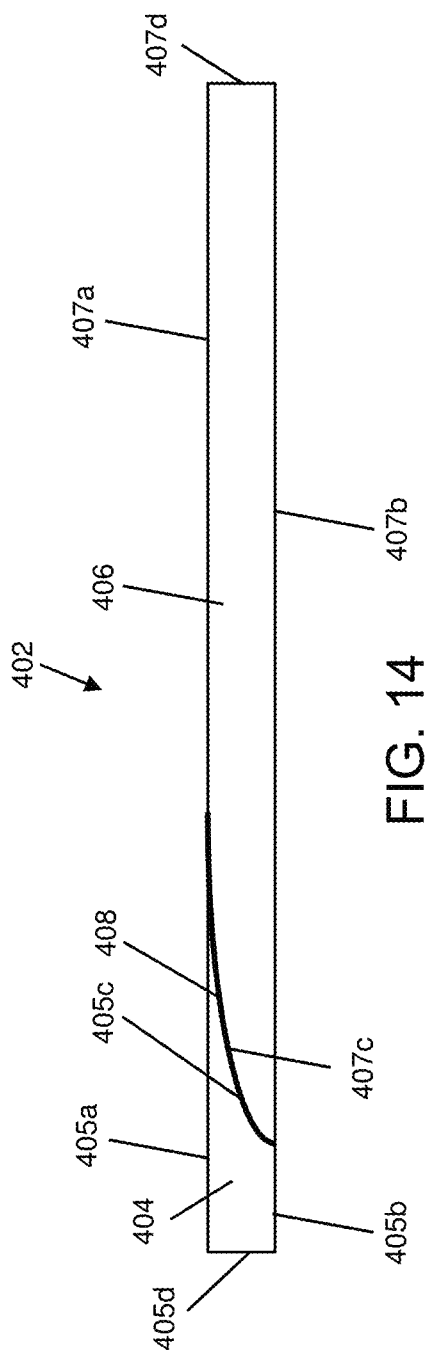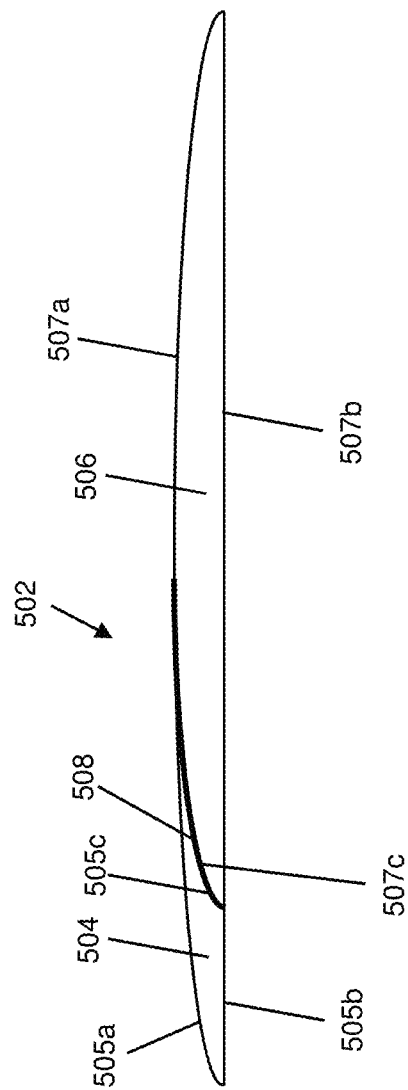

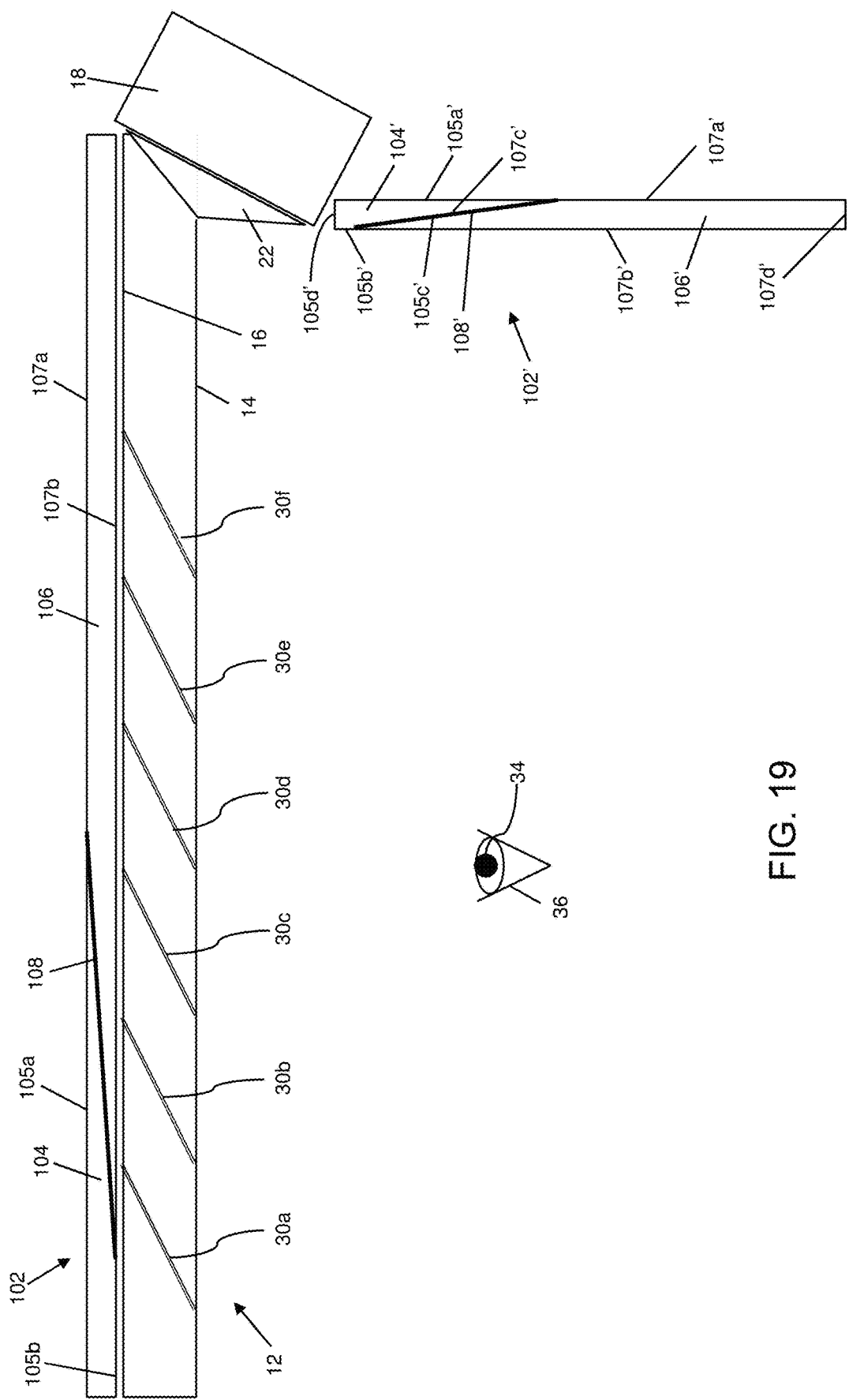

OPTICAL DEVICES FOR MITIGATING GHOST IMAGES

CROSS-REFERENCE TO RELATED APPLICATIONS

This application claims priority from U.S. Provisional Patent Application No. 62/993,100, filed Mar. 23, 2020, whose disclosure is incorporated by reference in its entirety herein.

TECHNICAL FIELD

The present invention relates to substrate-guided optical devices.

BACKGROUND OF THE INVENTION

Optical arrangements for near eye display (NED), head mounted display (HMD) and head up display (HUD) require large aperture to cover the area where the observer's eye is located (commonly referred to as the eye motion box—or EMB). In order to implement a compact device, the image that is to be projected into the observer's eye is generated by a small optical image generator (projector) having a small aperture that is multiplied to generate a large aperture.

An approach to aperture multiplication in one dimension has been developed based on a parallel-faced slab of transparent material within which the image propagates by internal reflection. Part of the image wavefront is coupled out of the slab, either by use of obliquely angled partial reflectors or by use of a diffractive optical element on one surface of the slab. Such a slab is referred herein as a light-guide optical element (LOE), light-transmitting substrate, or optical waveguide. The principles of such aperture multiplication are illustrated schematically in FIG. 1, which shows an optical device 10 that produces images and performs aperture expansion of the image. The optical device 10 has a light-guide optical element 12 formed from a transparent material and having a pair of parallel major external surfaces (faces) 14, 16 for guiding light by internal reflection (preferably but not necessarily total internal reflection). An image projector 18 (represented schematically as a rectangle) generates a projected image 20, as represented here schematically by a beam of illumination 20 including sample rays 20A and 20B which span the beam. The projected image 20 is coupled into the light-guide optical element 12 by an optical coupling-in configuration 22, as illustrated here schematically by a prism 22 (referred to interchangeably as a "wedge" or "prism"), so as to generate reflected rays 24 which are trapped by internal reflection within the substrate, generating also rays 26. Here, the coupling wedge 22 includes three major surfaces, one of which is located next to (or is common with) a slant edge face 28 of the LOE 12 (where the edge 28 is at an oblique angle to the faces 14, 16).

The coupled-in image 20 propagates along the substrate 12 by repeated internal reflection from the faces 14, 16, impinging on an optical coupling-out configuration 30, as illustrated here schematically by a sequence of partially reflective surfaces 30a, 30b, 30c, 30d, 30e, 30f collectively designated 30 at an oblique angle ($\alpha_{sur}$) to the parallel faces 14, 16, where part of the image intensity is reflected so as to be coupled out of the substrate as rays 32A and 32B toward the pupil 34 of an eye 36 of an observer that is located in the EMB 38 at a an eye relief (ER) distance 40 from the surface 14. The transparency of the substrate 12 enables the observer to view the coupled-out image 20 overlaid on the view of the external scene (i.e., real-world scene) at the front side of the substrate 12 (i.e., at the face 16), which is of particular use when the optical device 10 is deployed as part of an augmented reality (AR) system.

In order to minimize unwanted reflections of the image 20 which might give rise to ghost images, the partially reflective surfaces 30 are preferably coated so as to have low reflectance for a first range of incident angles, while having the desired partial reflectivity for a second range of incident angles, where a ray with a small inclination to the normal to a partially reflective surface 30 (represented here as angle $\beta_{ref}$) is split in order to generate a reflected ray for coupling out, while a high inclination (to the normal) ray is transmitted with negligible reflection.

The projected image 20 is a collimated image, i.e., where each pixel is represented by a beam of parallel rays at a corresponding angle, equivalent to light from a scene far from the observer (the collimated image is referred to as being "collimated to infinity"). The image is represented here simplistically by rays corresponding to a single point in the image, typically a centroid of the image, but in fact includes a range of angles to each side of this central beam, which are coupled in to the substrate with a corresponding range of angles, and similarly coupled out at corresponding angles, thereby creating a field of view (FOV) corresponding to parts of the image arriving in different directions to the eye 36 of the observer.

In addition to unwanted reflections of the image 20 which might give rise to ghost images, the optical properties of the substrate 12 and the coupling-out configuration 30 that enable the image 20 from image projector 18 to propagate along the substrate 12 by repeated internal reflection from the faces 14, 16 and to be coupled out by the coupling-out configuration 30 can also cause unwanted light from an external scene (i.e., a real-world scene) to be deflected toward the eye 36 of the observer, thereby resulting in external scene ghost images.

SUMMARY OF THE INVENTION

Aspects of the present invention provide optical devices for mitigating ghost images caused by light emanating from sources in an external scene.

According to the teachings of an embodiment of the present invention, there is provided an optical device. The optical device comprises: a light-transmitting substrate having at least two major surfaces for guiding light by internal reflection between the major surfaces; an optical coupling-out configuration for coupling the light, guided by internal reflection between the two major surfaces, out of the light-transmitting substrate toward an eye of a viewer; and an optical arrangement associated with at least one of the two major surfaces and including a first optical element and a second optical element optically coupled to the first optical element to define an interface region associated with at least a portion of the optical coupling-out configuration, the optical arrangement being deployed such that light rays emanating from an external scene and incident to the optical arrangement at a given range of incident angles are deflected at the interface region.

Optionally, the first and second optical elements each have a refractive index that is higher than a refractive index of the interface region.

Optionally, the interface region is formed as an air gap.

Optionally, the interface region is formed as a transparent layer of low index material.

Optionally, the first and second optical components each include a plurality of surfaces and are correspondingly configured and adjacently placed via corresponding surfaces of the plurality of surfaces so as to define the interface region.

Optionally, each of the first and second optical elements is a prism having first and second mutually parallel surfaces and a third surface oblique to the first and second mutually parallel surfaces, and wherein the first and second optical elements are optically coupled to each other at the third surface.

Optionally, the optical arrangement is formed as a lens.

Optionally, the interface region has a linear surface profile.

Optionally, the interface region has a non-linear surface profile.

Optionally, the interface region includes a second light-transmitting substrate having a pair of parallel faces and a plurality of partially reflective surfaces deployed within the second light-transmitting substrate oblique to the parallel faces.

Optionally, each of the partially reflective surfaces includes: a pair of transparent layers and a rough transparent layer coated with a low refractive index material deployed between the pair of transparent layers, wherein each of the pair of transparent layers has a refractive index that is higher than the refractive index of the low refractive index material.

Optionally, the light rays emanating from the external scene at the given range of angles are deflected at the interface region so as to be trapped within the first optical element by internal reflection.

Optionally, the light rays emanating from the external scene at the given range of angles enter the optical arrangement via a first surface of the first optical element, are reflected at the interface region, are reflected at the first surface of the first optical element, and are reflected at the interface region toward a second surface of the first optical element and away from the light-transmitting substrate.

Optionally, the second surface of the first optical element is associated with a light collecting or dissipating component.

Optionally, light rays emanating from the external scene at a range of angles outside of the given range of angles enter the optical arrangement via a first surface of the first optical element, are transmitted by the interface region, exit the optical arrangement via a first surface of the second optical element and pass through the light-transmitting substrate to the eye of the viewer.

Optionally, the optical arrangement is such that in the absence of the optical arrangement, the light rays emanating from the external scene at the given range of angles enter the light-transmitting substrate and are coupled out of the light-transmitting substrate, by the optical coupling-out configuration, toward the eye of the viewer.

Optionally, the optical device further comprises: a second optical arrangement deployed at an orientation orthogonal to the light-transmitting substrate and at an end of the light-transmitting substrate.

Optionally, the optical coupling-out configuration includes at least one partially reflective surface located within the light-transmitting substrate.

Optionally, the optical coupling-out configuration includes a plurality of partially reflective surfaces at least partially traversing the light-transmitting substrate.

Optionally, the optical device further comprises: an image projector coupled to a proximal end of the light-transmitting substrate so as to introduce light waves corresponding to a collimated image into the light-transmitting substrate, wherein the interface region spans a subset of the partially reflective surfaces located near a distal end of the light-transmitting substrate that is opposite the proximal end.

Optionally, the optical coupling-out configuration includes a diffractive element associated with one of the two major surfaces.

Optionally, the optical device further comprises: an image projector coupled to the light-transmitting substrate so as to introduce light waves corresponding to a collimated image into the light-transmitting substrate such that the collimated image propagates by internal reflection within the light-transmitting substrate and is coupled out of the light-transmitting substrate by the optical coupling-out configuration.

Optionally, the optical device further comprises: an optical coupling-in configuration associated with the light-transmitting substrate and the image projector for receiving the collimated image from the image projector and coupling the collimated image into the light-transmitting substrate.

There is also provided according to an embodiment of the teachings of the present invention an optical device. The optical device comprises: a light-transmitting substrate having a pair of faces for guiding light by internal reflection between the faces; an optical coupling-out configuration for coupling the light, guided by internal reflection between the faces, out of the light-transmitting substrate toward an eye of a viewer; and at least one optical element having a plurality of surfaces including a pair of parallel major surfaces and a third major surface oblique to the pair of parallel major surfaces and associated with at least a portion of the optical coupling-out configuration, wherein an interface region having a refractive index lower than a refractive index of the at least one optical element is defined at least in part by the third major surface, the at least one optical element is deployed with one of the major surfaces of the pair of parallel major surfaces in association with one of the faces of the light-transmitting substrate such that light rays emanating from an external scene and incident to the other of the major surfaces of the pair of parallel major surfaces at a given range of incident angles are deflected at the interface region.

Optionally, the plurality of surfaces of the at least one optical element further includes a fourth surface, and wherein the light rays emanating from the external scene at the given range of angles enter the at least one optical element via the other of the major surfaces of the pair of parallel major surfaces, are reflected at the interface region, are reflected at the other of the major surfaces of the pair of parallel major surfaces, and are reflected at the interface region toward the fourth surface and away from the light-transmitting substrate.

Optionally, the fourth surface is associated with a light collecting or dissipating component.

Optionally, the interface region is further defined in part by a transparent plate optically coupled to the third major surface.

There is also provided according to an embodiment of the teachings of the present invention an optical device. The optical device comprises: a light-transmitting substrate having at least two major surfaces for guiding light by internal reflection between the major surfaces; an optical coupling-out configuration for coupling the light, guided by internal reflection between the two major surfaces, out of the light-transmitting substrate toward an eye of a viewer; and an optical arrangement associated with at least one of the two major surfaces and including a pair of optical elements adjacently positioned to define an interface region associated with at least a portion of the optical coupling-out configuration, the interface region having a refractive index that is smaller than a refractive index of the optical elements, and the optical arrangement being deployed such that light rays emanating from an external scene and incident to the optical arrangement at a given range of incident angles are deflected at the interface region.

There is also provided according to an embodiment of the teachings of the present invention an optical device. The optical device comprises: a first light-transmitting substrate having at least first and second major surfaces for guiding light by internal reflection between the first and second major surfaces; an optical coupling-out configuration for coupling the light, guided by internal reflection between the first and second major surfaces, out of the first light-transmitting substrate toward an eye of a viewer; and an optical arrangement including: a second light-transmitting substrate having at least two major surfaces, wherein one of the two major surfaces of the second light-transmitting substrate is associated with the first or second major surface of the first light-transmitting substrate, and a plurality of partially reflective surfaces deployed within a portion of the second light-transmitting substrate oblique to the two major surfaces of the second light-transmitting substrate to define an interface region associated with at least a portion of the optical coupling-out configuration, the optical arrangement being deployed such that light rays emanating from an external scene and incident to the optical arrangement at a given range of incident angles are deflected or absorbed at the interface region.

Within the context of this document, the term "guided" generally refers to light that is trapped within a light-transmitting material (e.g., a substrate) by internal reflection at major external surfaces of the light-transmitting material, such that the light that is trapped within the light-transmitting material propagates in a propagation direction through the light-transmitting material. Light propagating within the light-transmitting substrate is trapped by internal reflection when the propagating light is incident to major external surfaces of the light-transmitting material at angles of incidence that are within a given angular range. The internal reflection of the trapped light may be in the form of total internal reflection, whereby propagating light that is incident to major external surfaces of the light-transmitting material at angles greater than a critical angle (defined in part by the refractive index of the light-transmitting material and the refractive index of the medium in which the light-transmitting is deployed, e.g., air) undergoes internal reflection at the major external surfaces. Alternatively, the internal reflection of the trapped light may be effectuated by a coating, such as an angularly selective reflective coating, applied to the major external surfaces of the light-transmitting material to achieve reflection of light that is incident to the major external surfaces within the given angular range.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 14 is a schematic side view of an optical arrangement that deflects ghost-image-causing light rays according to another embodiment of the present invention that is similar to the optical arrangement of FIG. 5, but with an interface region having a non-linear surface profile;

FIG. 15 is a schematic side view of an optical arrangement that deflects ghost-image-causing light rays according to another embodiment of the present invention that is similar to the optical arrangement of FIG. 13, but with an interface region having a non-linear surface profile;

FIG. 19 is a schematic side view similar to FIG. 5, but with a second optical arrangement deployed at or near an image projector of the optical device in an orientation orthogonal to the LOE.

DESCRIPTION OF THE PREFERRED EMBODIMENTS

Figure 1:
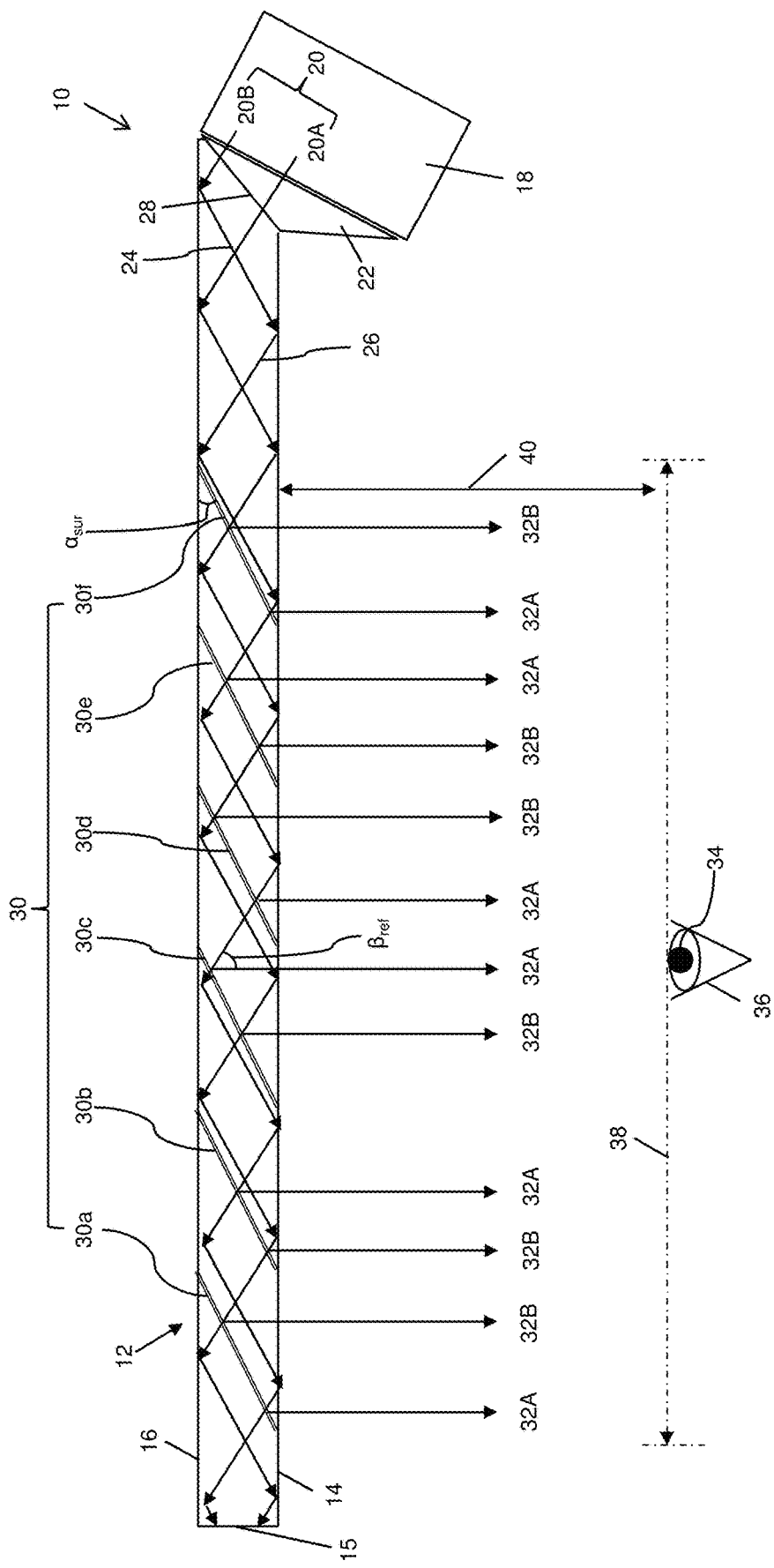
FIG. 1 is a schematic side view, described above, of a prior art light-guide optical element (LOE) employing partially-reflective surfaces, for use in a near-eye display.

Embodiments of the present invention provide optical devices for mitigating ghost images caused by light emanating from sources in an external scene.

The principles and operation of the optical devices according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 2:
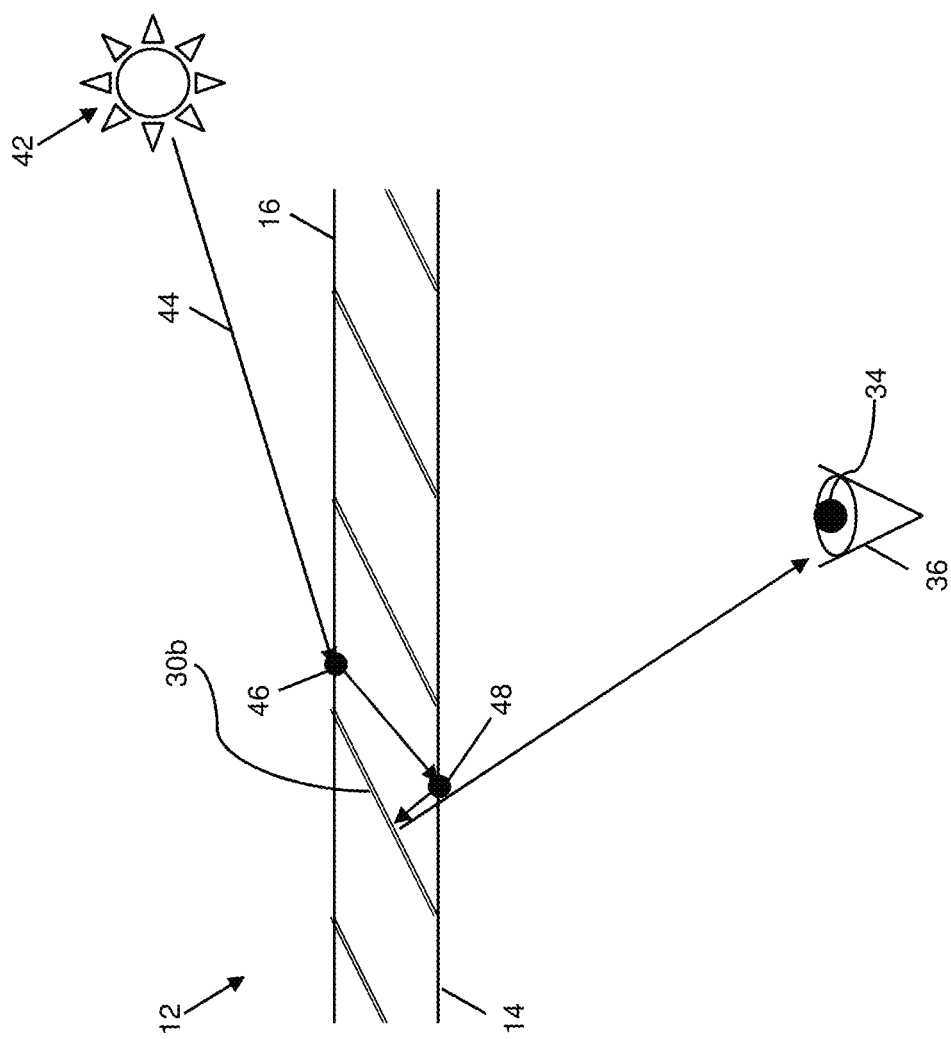
FIG. 2 is a schematic side view illustrating the deflection of a representative light ray, emanating from a source in an external scene at a front side of the LOE of FIG. 1, by one of the partially-reflective surfaces toward the eye of an observer so as to form a ghost image of the external scene.
Figure 3:
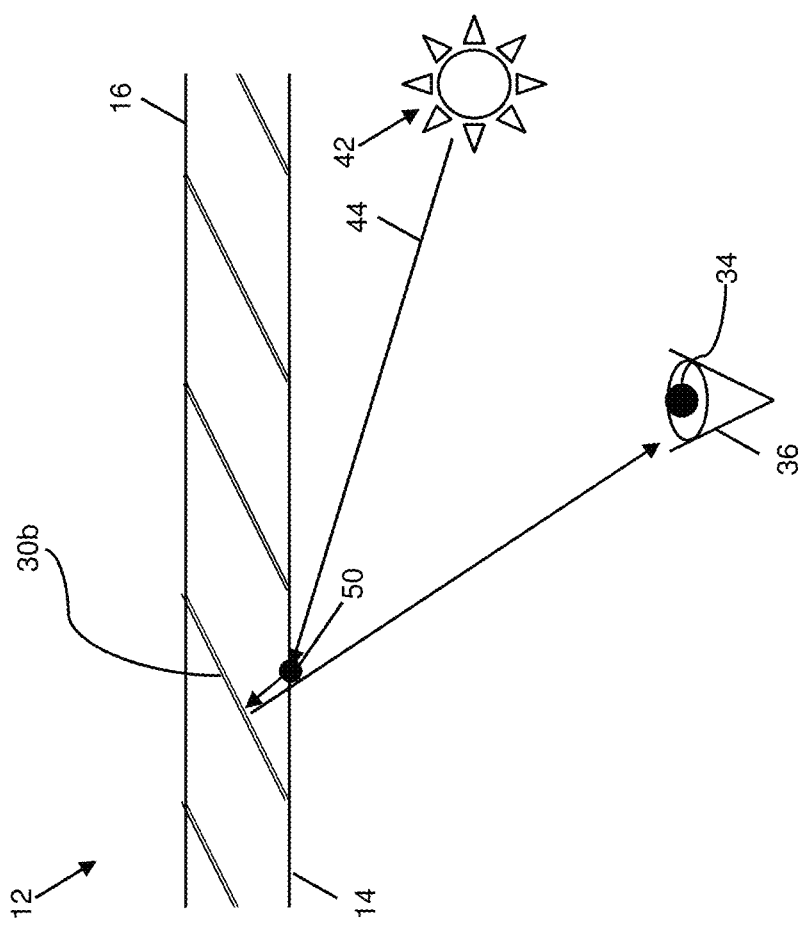
FIG. 3 is a schematic side view illustrating the deflection of a representative light ray, emanating from a source in an external scene at a back side of the LOE of FIG. 1, by one of the partially-reflective surfaces toward the eye of an observer so as to form a ghost image of the external scene.

By way of introduction, FIGS. 2 and 3 are reproductions of portions of the substrate 12 and the partially reflective surfaces 30 from FIG. 1, annotated to illustrate example scenarios in which unwanted light from a source 42—that is part of an external scene—is deflected toward the eye 36 resulting in external scene ghost images. The source 42 is typically any source of light that can provide illumination in the external scene, including natural illumination sources such as, for example, the sun, and artificial illumination sources such as, for example, lamps, display screens, light bulbs, and the like. In FIG. 2, the substrate 12 is deployed with the face 16 in facing relation to the source 42. A sample ray 44, representative of the light emanating from the source 42, strikes the face 16 at a grazing angle (large angle of incidence—or AOI), and enters the substrate 12 at point 46 via refraction. The light ray 44 is partially reflected at the face 14 by the principal plane (at point 48) toward one of the partially reflective surfaces 30 (the partially reflective surface 30b in this example), which reflects the light ray 44 back through the face 14 so as to exit the substrate 12 and propagate towards the eye 36. The propagation of the light ray 44 within the substrate 12 is not by (total) internal reflection, due to the fact that the source of the light ray 44 is not the image projector 20 but rather the real-world. Thus, in contrast to the image 20 in FIG. 1 which emerges from the substrate 12 (as rays 32A and 32B) normal to the face 14 and within the FOV, the proportion of the light ray 44 that is deflected toward the eye 36 emerges from the substrate 12 at angles oblique to the face 16 and outside of the FOV.

In FIG. 3, the source 42 is located on the same side of the substrate 12 as the eye 36. Here, the light ray 44 strikes the face 14 at a grazing angle (large AOI) at point 50 and enters the substrate 12 at point 50 via refraction. The light ray 44 then impinges on one of the partially reflective surfaces 30 (the partially reflective surface 30b in this example) which reflects the light ray 44 back through the face 14 so as to exit the substrate 12 towards the eye 36.

The ghost images resultant from unwanted light rays in the scenarios depicted in FIGS. 2 and 3—in which the ghost image is outside the FOV and typically undergoes at most one reflection from a given partially reflective surface—are referred to hereinafter interchangeably as ghosts.

Reference is now made to FIGS. 5-19, which illustrate various aspects of the structure and operation of an optical device, generally designated 100, constructed and operative according to embodiments of the present invention, for mitigating/reducing ghosts. The optical device 100 generally includes all of the components of the optical device 10, but also includes a light deflecting optical arrangement 102 (referred to hereinafter as an "optical arrangement") for deflecting light arriving at a particular range of AOIs. More specifically, the optical device 100 includes a light-guide optical element 12 (also referred to as an LOE, light-transmitting substrate or optical waveguide), which is formed from a transparent material (such as glass) and having a pair of major external surfaces (faces) 14, 16 deployed with one of surfaces 14 in facing relation to the eye 36 of a viewer/observer, an optical coupling-out configuration 30 (schematically represented as an array of partially reflective surfaces that at least partially traverse the substrate 12) associated with one or both of the faces 14, 16, and an image projection arrangement (i.e., image projector) 18 for generating a collimated image to be coupled into the LOE 12 via an optical coupling-in configuration 22 (illustrated here schematically by a prism). The optical arrangement 102 is associated with at least one of the faces 14, 16, and in certain non-limiting embodiments generally includes two optical elements formed from material having a suitably high refractive index (preferably in the range of 1.5-1.9), and that are optically coupled to each other to define an interface region having a suitably low refractive index that is smaller than the refractive index of the two optical elements (preferably in the range of 1-1.35).

The optical arrangement 102 is deployed such that light rays (represented by the light ray 44 and referred to interchangeably hereinafter as "unwanted light") that emanate from a source (e.g., the source 42) in the external scene, that are incident to the optical arrangement 102 (in particular a first of the optical elements of the optical arrangement 102) over a given range of AOIs, are deflected at the interface region. The interface region deflects the unwanted light away from the substrate 12 and the optical coupling-out configuration 30, thereby preventing the unwanted light from reaching the eye 36. The unwanted light is generally defined as the particular set of light rays that are incident to the optical arrangement 102 at the given range of AOIs that in the absence of the optical arrangement 102 would produce ghosts.

Figure 4:
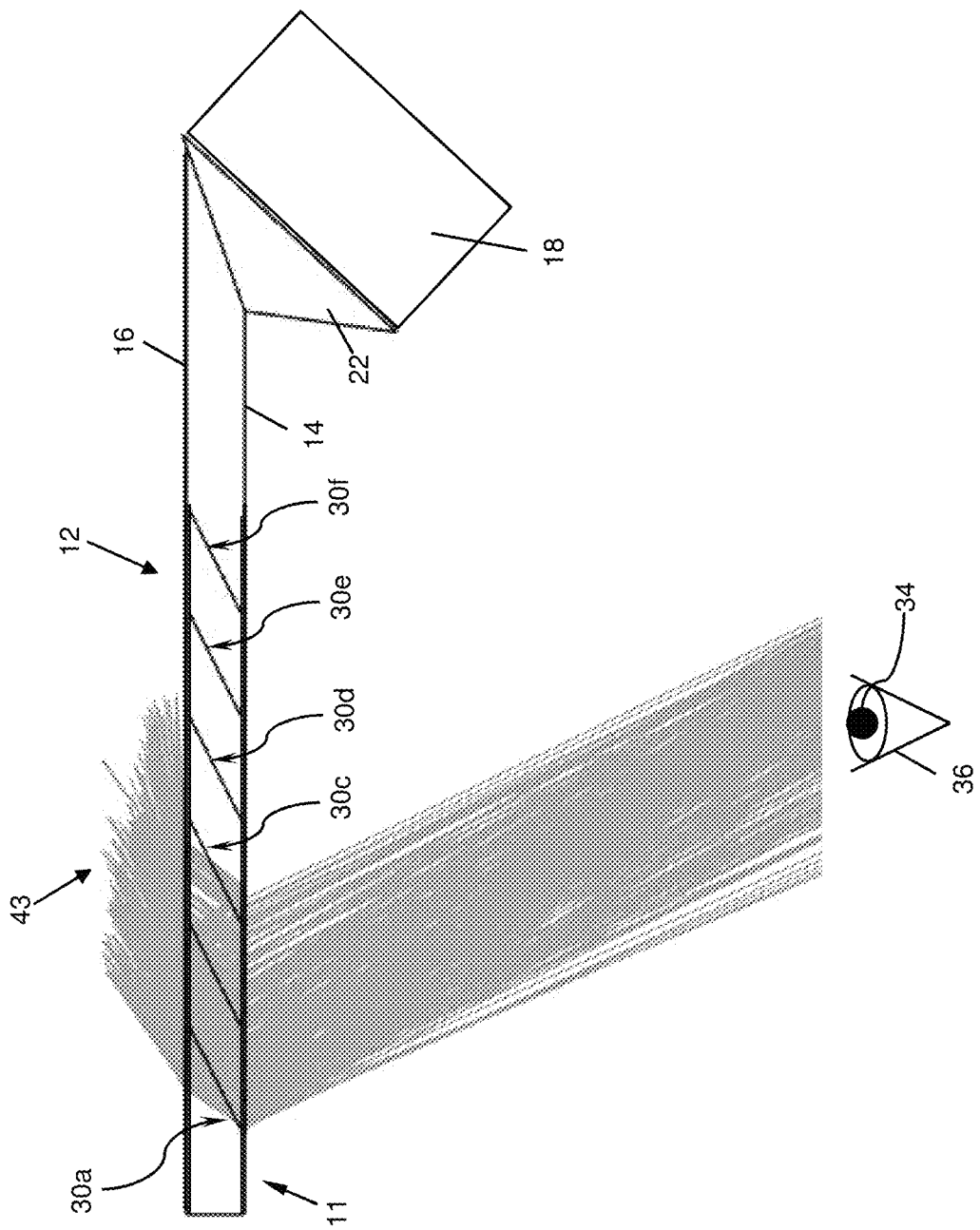
FIG. 4 is a schematic side view illustrating the angular distribution of light rays that cause ghost images.

Before describing the structure and operation of the optical arrangement 102 in detail, it is first noted that since the unwanted light from the external scene (represented by light ray 44) is outside of the FOV, in order for the unwanted light to reach the EMB (i.e., reach the eye 36) the deflected/reflected light should exit the edge or extremity portion of the LOE 12. This is illustrated schematically in FIG. 4, which shows the angular distribution of unwanted light rays 43 reaching the eye 36 (within the EMB) via the partially reflective surfaces 30a, 30b, 30c located at or near the distal end 11 of the LOE 12. This means that only the unwanted light rays at the edge of the active area of the set of partially reflective surfaces 30 need to be deflected by the optical arrangement 102 in order to mitigate external scene ghost images. In addition, only the light rays impinging on the faces 14, 16 at a given range of angles (i.e., a given angular distribution) above a certain grazing angle measured from the right to normal to the faces 14, 16 need to be deflected by the optical arrangement 102. In the present context, the distal end 11 of the LOE 12 is arbitrarily defined as being on the left-side of the drawing, and is opposite the proximal end 13 (at the right-side of the drawing) of the LOE 12 wherein the image projector 18 and the optical coupling-in configuration 22 are located at or near the proximal end 13 of the LOE 12.

Figure 5:
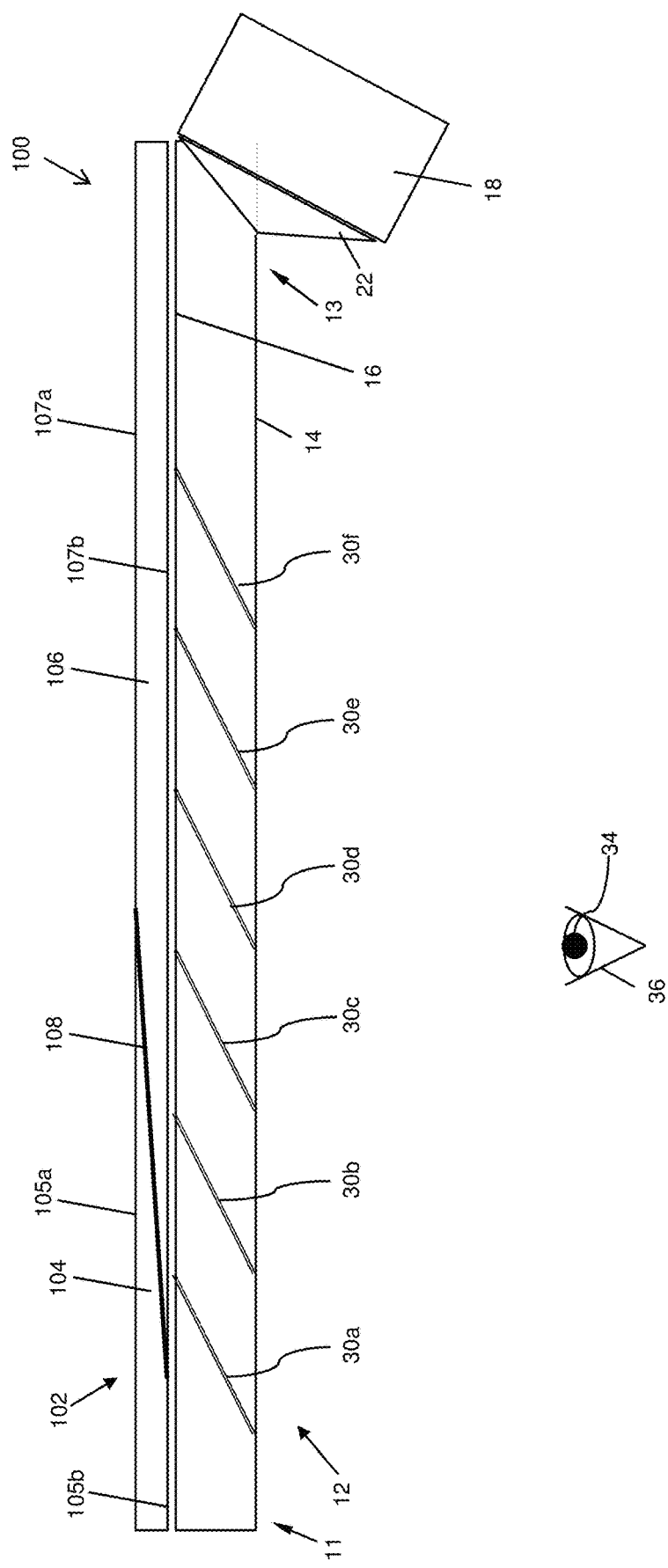
FIG. 5 is a schematic side view of an optical device, constructed and operative according to an embodiment of the present invention, that includes an LOE and an optical arrangement associated with a front face of the LOE and having a pair of optical elements optically coupled to each other to define an interface region that deflects ghost-image-causing light rays.

Bearing the above in mind, reference is made to FIG. 5, which shows the optical arrangement 102 deployed at the face 16 in order to combat/mitigate ghost images that are caused by light sources in an external scene that is located at the front of the LOE 12 (i.e., when the face 16 is in facing relation to the external scene having the light source, as in FIG. 2). As mentioned, in certain embodiments the optical arrangement 102 is generally formed from at least two optical components, illustrated here as a first optical component 104 and a second optical component 106, that are correspondingly configured and optically coupled to each other to define an interface region 108 (alternatively referred to as an "interface surface" or an "interface layer") that is associated with at least a portion of the optical coupling-out configuration 30. In preferred embodiments, the interface region 108 is associated with the partially reflective surfaces 30 at the edge of the active area, i.e., the last few partially reflective surfaces located closer to the distal end 11 of the LOE 12. In the illustrated example, the interface region 108 is associated with the last three partially reflective surfaces 30—designated 30a, 30b, 30c.

Figure 6:
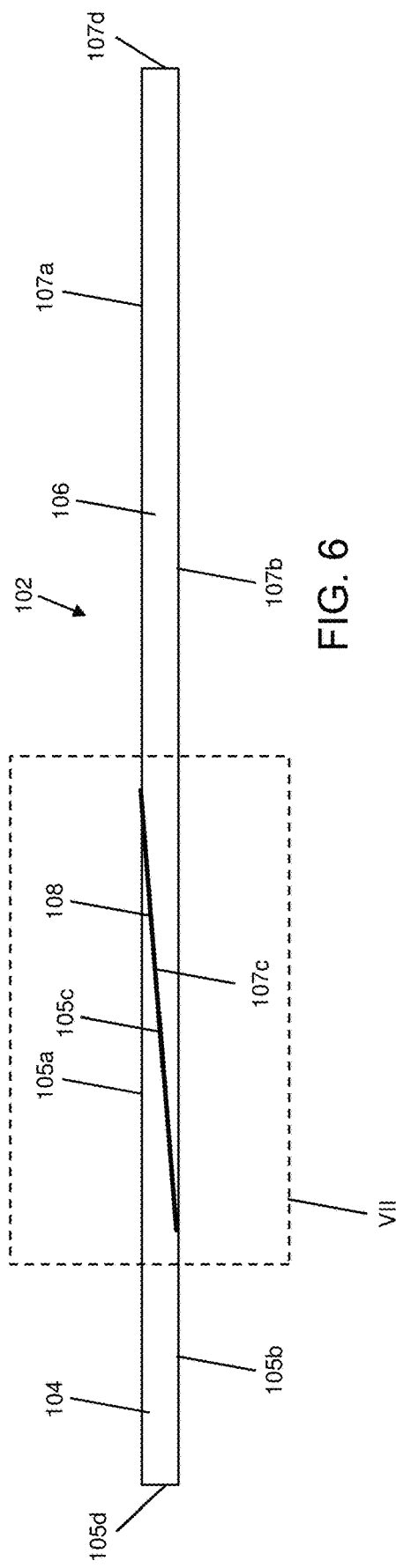
FIG. 6 is a schematic side view illustrating the components of the optical arrangement of FIG. 5.
Figure 7:
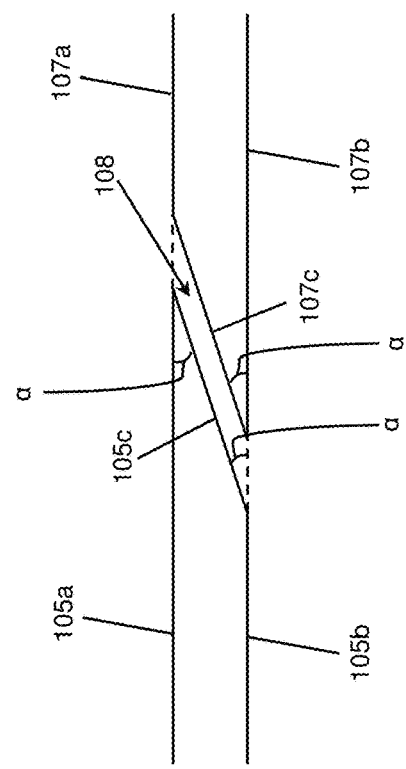
FIG. 7 is an enlarged view of the region of FIG. 6 designated VII.

FIGS. 6 and 7 show a more detailed view of the optical arrangement 102, without the LOE, coupling prism and image projector, according to certain embodiments. FIG. 7 shows an enlarged view of the region of FIG. 6 designated VII. In certain non-limiting implementations, such as some of the implementations illustrated in FIGS. 5-10, the optical components 104, 106 are implemented as a pair of correspondingly configured prisms such that the optical arrangement 102 forms a generally rectangular cross-section (i.e., a rectangular shape in the plane of the paper). In such implementations, these prisms 104, 106 are preferably (but not necessarily) quadrilaterals in the plane of the paper. The specific structure and properties of these prisms 104, 106 will now be described.

The first optical element 104 generally includes a plurality of surfaces including at least four planar major surfaces (i.e., faces), designated 105a, 105b, 105c, 105d. The surfaces 105a and 105b are preferably mutually parallel and are of different lengths. In the illustrated embodiment the length of the surface 105a is greater than the length of the surface 105b (the lengths being measured along the horizontal axis). The surface 105c extends between respective first ends of the surfaces 105a, 105b and is oblique to the surfaces 105a, 105b. In FIG. 7, the oblique angle α is the angle formed between the surfaces 105a and 105c. The surface 105d extends between respective second ends of two surfaces 105a, 105b (opposite the first ends) and is preferably (but not necessarily) orthogonal to the surfaces 105a, 105b.

Similarly, the second optical element 106 generally includes a plurality of surfaces (i.e., faces) including at least four planar major surfaces, designated 107a, 107b, 107c, 107d. The surfaces 107a and 107b can be mutually parallel, as shown, and are of different lengths. In the illustrated embodiment the length of the surface 107b is greater than the length of the surface 107a. The surface 107c extends between respective first ends of the surfaces 107a, 107b and is oblique to the surfaces 107a, 107b. In the embodiment illustrated in FIG. 7, the same oblique angle α is formed between the surfaces 107b and 107c. The surface 107d extends between respective second ends of two surfaces 107a, 107b (opposite the first ends). The surface 107d may or may not be orthogonal to the surfaces 107a, 107b. In the embodiments illustrated in FIGS. 5-10, the surfaces 105a, 107a are coplanar, as are the surfaces 105b, 107b and the surfaces 105c, 107c.

As mentioned, the optical elements 104, 106 are correspondingly configured. In particular, the optical elements 104, 106 are optically coupled to each other by placing the surfaces 105c, 107c adjacent to each other via a mechanical or an optical attachment. The adjacent placement of the surfaces 105c, 107c defines the interface region 108, which is located at the surfaces 105c, 107c. As should be apparent, the interface region 108 is oblique to the surfaces 105a, 105b, 107a, 107b (due to the geometry of the components of the optical arrangement 102). In certain non-limiting embodiments, such as the embodiments illustrated in FIGS. 5-10, each of the surfaces 105c, 107c is planar so as to have a linear surface profile such that the interface region 108 also has a linear surface profile (the interface region is linear in the plane of the paper).

As mentioned, the optical elements 104, 106 are formed from a material having a suitably high refractive index (referred to as a "high index material"), and the interface region 108 is formed from a material having a suitably low refractive index (referred to as a "low index material") that is lower (i.e., smaller) than the refractive index of the optical elements 104, 106. Examples of materials that can be used to form the optical elements 104, 106 include different types of glass (e.g., BK7 which as a refractive index of approximately 1.52), polymers, and the like. Examples of materials that can be used to form the interface region 108 will be provided in the subsequent paragraphs.

In the embodiment illustrated in FIG. 5, the optical arrangement 102 is deployed at the face 16 via an optical coupling between the face 16 and the surfaces 105b, 107b. The geometry of the optical arrangement 102 is such that the interface region 108 is oblique to the faces 14, 16 of the LOE 12. Preferably, the optical arrangement 102 is optically coupled to the LOE 12 such that the face 16 is parallel to the surfaces 105b, 107. In certain non-limiting implementations, the optical coupling is effectuated by a layer of optical adhesive deployed between the face 16 and the surfaces 105b, 107b. In other non-limiting implementations, the optical coupling may be effectuated by a mechanical attachment whereby the optical arrangement 102 is mechanically positioned with the surfaces 105b, 107b adjacent to the face 16 with an air gap maintained between the surfaces 105b, 107b and the face 16.

The interface region 108 can be implemented in various ways. In one set of non-limiting implementations, the interface region 108 is implemented as an air gap so as to have a refractive index of approximately 1. Such an air gap can be implemented, for example, by deploying the first optical element 104 with the surface 105b adjacent to a first portion of the face 16 (via, for example, mechanical attachment, optical adhesive, etc.) and deploying the second optical element 106 with the surface 107b adjacent to a second portion of the face 16 (via, for example, mechanical attachment, optical adhesive, etc.) so as to maintain a uniform air gap between the surfaces 105c, 107c. In other non-limiting implementations, the interface region 108 is implemented as a thin layer of transparent low index material, such as a layer of optical adhesive, a layer of solid dielectric material, a thin film dielectric coating, or a thin transparent plate of low-index material. In such implementations, the optical elements 104, 106 may be deployed similar to as in the air gap implementation, and a thin layer of transparent low index material can be deployed between the optical elements 104, 106 at the surfaces 105c, 107c.

There are optical adhesives available in the market having refractive index of approximately 1.3. Such an optical adhesive can be deposited on either of the surfaces 105c, 107c. Solid dielectric materials are also available in the market, for example in the form of a family of Aerogel materials that have been developed. These Aerogel materials have refractive index in the range of 1.1-1.2, and also have stabilized mechanical properties. Such Aerogel material can be applied to either of the surfaces 105c, 107c. Alternatively, a thin film dielectric coating having the requisite reflective properties (i.e., transmissive at low AOIs and highly reflective at larger AOIs) can be applied to either of the surfaces 105c, 107c.

Figure 8:
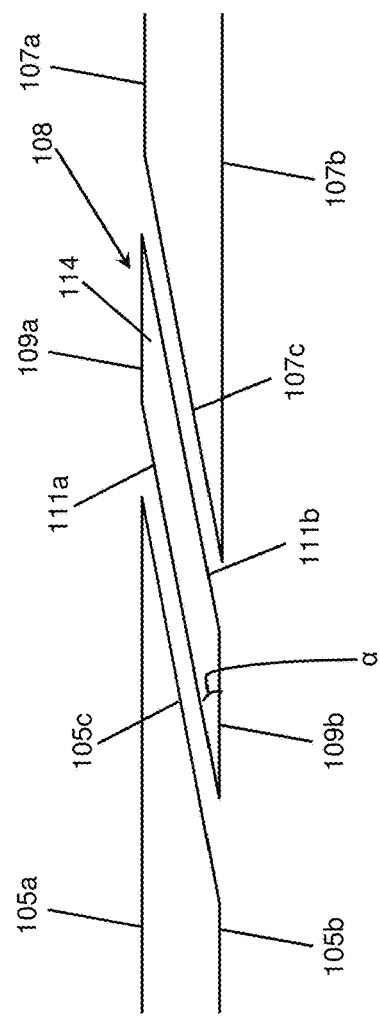
FIG. 8 is a schematic side view of the optical arrangement of FIG. 5 in which the interface region is implemented as a thin transparent plate.

FIG. 8 illustrates a non-limiting implementation according to certain embodiments of the present disclosure, in which the interface region 108 is implemented as a thin transparent plate 114. In such embodiments, the transparent plate 114 includes two pairs of mutually parallel sides (i.e., surfaces, faces) 109a, 109b, 111a, 111b. Here, the plate 114 is dimensioned corresponding to the dimensions of the optical elements 104, 106, in particular the lengths of the sides 111a, 111b correspond to the lengths of the surfaces 105c, 107c such that the distance between the sides 109a, 109b corresponds to the thickness of the optical elements 104, 106 (measured between the surfaces 105a, 105b and or the surfaces 107a, 107b). Accordingly, the sides 109a, 109b are shorter than the sides 111a, 111b, forming a non-rectangular parallelogram cross-section, i.e., adjacent sides of the transparent plate 114 are at oblique angles to each other. In particular, the angle between the sides 111a, 109b and between the sides 111b, 109a is α (as per the oblique deployment of the surfaces 105c, 107c). In such an implementation, one of the short sides 109a of the transparent plate 114 is coplanar with the surfaces 105a, 107a, while the other of the short sides 109b of the transparent plate 114 is coplanar with the surfaces 105b, 107b. One of the long sides 111a of the transparent plate 114 is optically attached to the surface 105c and is practically (i.e., effectively) coincident with the surface 105c, and the other of the long sides 111b is optically attached to the surface 107c and is practically coincident with the surface 107c. The sides 111a, 111b may be optically attached to the respective surfaces 105c, 107c via a thin layer of optical adhesive. Alternatively, the thin transparent plate 114 may be mechanically positioned with the sides 111a, 111b deployed adjacent to, and practically coincident with, the respective surfaces 105c, 107c. It is noted that the size of the gap between the sides 111a, 111b and the respective surfaces 105c, 107c, as illustrated in FIG. 8, is exaggerated for clarity of illustration, and in practice such a gap is preferably practically non-existent.

As mentioned, the interface region 108 is associated with at least a portion of the optical coupling-out configuration 30, and in the example deployment configuration illustrated in FIG. 5 is associated with the last three partially reflective surfaces 30a, 30b, 30c. In particular, the interface region 108 spans at least part of the last partially reflective surface 30a and spans the entirety of the partially reflective surfaces 30b, 30c. This deployment prevents light rays that are incident to the optical arrangement 102 at a first given range of incident angles from being reflected from the last two partially reflective surfaces 30a, 30b and reaching the eye 36.

It is noted that the relative lengths of the surfaces 105a, 105b, 107a, 107b determine the oblique angle α and vice versa. It is further noted that since the interface region 108 only needs to be associated with some of the partially reflective surfaces 30 (typically at most half of the partially reflective surfaces 30), the length of the optical element 104 is significantly less than the length of the optical element 106, and the length of the surface 105b is significantly less than the length of the surface 107a. Within the present context, the lengths of the optical elements 104, 106 are defined by the lengths of the surfaces 105a, 107b, respectively, and the lengths of the surfaces 105a, 105b, 107a, 107b are measured along the horizontal axis (spanning between surfaces 105d and 107d). In certain non-limiting implementations, the surface 107b has a length that is approximately twice the length of the surface 105a, and the surface 107a has a length that is approximately five times the length of the surface 105b. In such implementations, the surface 105a has a length that is approximately 1.5 times the length of the surface 105b, and the surface 107b has a length that is approximately four times the length of the surface 107a. The multiplicative factors of the surface lengths of the two optical elements 104, 106 can depend on various factors, including, for example, the number of partially reflective surfaces and the desired oblique angle α. For example, the number of partially reflective surfaces to be associated with the interface region 108 can be selected, which dictates the oblique angle α, which would then dictate the corresponding lengths of the surfaces 105a, 105b, 107a, 107b.

Figure 9:
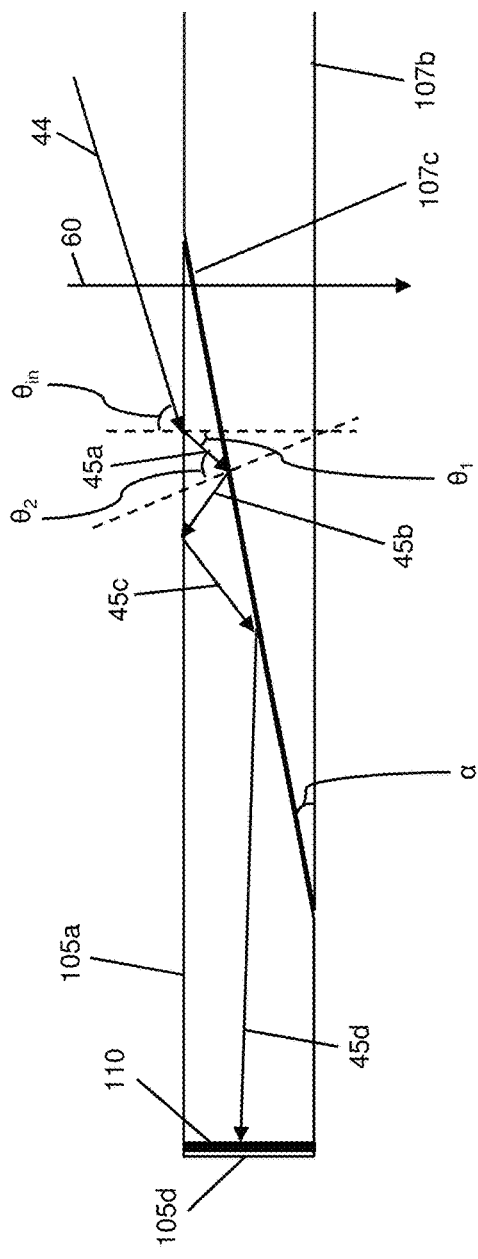
FIG. 9 is a schematic side view illustrating the deflection of a sample light ray by the interface region of the optical arrangement of FIGS. 5 and 6.

FIG. 9 shows the interaction of light rays with the components of the optical arrangement 102 by way of example of two incident light rays, namely the light ray 44 and the light ray 60. For clarity of illustration, the thickness of the interface region 108 is reduced substantially compared to interface region thickness illustrated in FIGS. 7 and 8. The light ray 44 is representative of the light rays in the particular set of light rays that are incident to the optical arrangement 102 at a first given range of incident angles that in the absence of the optical arrangement 102 would produce ghosts. The light ray 60 is representative of light rays that are incident to the optical arrangement 102 at a second given range of incident angles outside of the first given range. The light rays in the second range of incident angles would not result in ghosts in the absence of the optical arrangement 102, and it is therefore preferable that the light rays in the second given range be largely unaffected by the optical arrangement 102. The second optical element 106 ensures that such light rays are largely unaffected by the optical arrangement 102, and enables these light rays to reach the LOE 12 at an AOI that is the same (or approximately the same) as the AOI at which these light rays reach the optical element 104.

Looking first at the traversal of the light ray 60, the light ray 60 is incident to the surface 105a of the optical element 104 of the optical arrangement 102 at an AOI of approximately 0° (i.e., approximately normal to the surface 105a). The incident light ray 60 enters the optical arrangement 102 via the surface 105c and impinges on the interface region 108 at an AOI (measured relative to the normal to the interface region 108) that is less than a critical angle $\theta_c$ (defined by the refractive index of the optical element 104 and the refractive index of the interface region 108), such that the light ray 60 enters (i.e., is transmitted into) the interface region 108. The light ray 60 may undergo some refraction due to the change from the high refractive index of the first optical element 104 to the low refractive index of the interface region 108. The light ray 60 then exits the interface region 108 and enters the second optical element 106, and may undergo some refraction due to the change from the low refractive index of the interface region 108 to the high refractive index of the second optical element 106. Since the optical elements 104, 106 preferably have the same refractive index, the double refraction of the light ray 60 due to the transition from high index to low index to high index ensures that the propagation direction of the light ray 60 is largely unaffected by the optical arrangement 102. In other words, the incident ray 60 propagates through the interface region 108 without any significant change in propagation angle, such that the ray 60 enters the optical element 106 (via the surface 107c) largely at the same angle as it exited the optical element 104 (via the surface 105c). In addition, due to the corresponding configuration and common refractive index of the optical elements 104, 106, the light ray 60 enters the optical arrangement 102 (via the surface 105a of the optical element 104) and exits the optical arrangement 102 (via the surface 107b of the optical element 106) largely at approximately the same angle.

Although not shown in the drawings, after exiting the optical arrangement 102, the light ray 60 impinges on the face 16 of the LOE 12 at approximately the same AOI that the light ray 60 impinged on the surface 105a. In this particular example, the AOI is approximately 0°, and the light ray 60 enters the LOE 12 via the face 16 and passes directly through the LOE 12 (without reflection or with a negligible amount of reflection from the partially reflective surfaces 30) so as to exit the LOE 12 via the face 14 and so as to be viewed by the eye 36 of the observer. Accordingly, the optical arrangement 102 does not obscure the observer's view of the external scene.

The light ray 44 is incident to the surface 105a of the optical arrangement 102 at a grazing angle (large AOI—relative to the surface 105a— designated $\theta_{in}$). A proportion of the intensity of the light ray 44 is coupled into the optical arrangement 102 as light ray 45a, wherein the transmitted light ray 45a propagates at an angle of $\theta_1$ (which can be computed from $\theta_{in}$ using the refractive index of the optical element 104 and the refractive index of the medium in which the optical arrangement 102 is deployed, e.g., air, in accordance with Snell's law). The transmitted light ray 45a impinges on the interface region 108 at an AOI of $\theta_2$ (measured relative to the normal to the interface region 108). The angle $\theta_2$ can be computed using the following expression: $\theta_2=\theta_1+\alpha$ (where α is the oblique angle formed between the surfaces 107b and 107c.

If $\theta_2$ is greater than the critical angle $\theta_c$, the light ray 45a is totally internally reflected (i.e., undergoes total internal reflection, TIR) at the interface region 108 as reflected light ray 45b. The TIR reflected light ray 45b propagates back toward the surface 105a, and undergoes internal reflection at the surface 105a so as to propagate back toward the interface region 108 as reflected light ray 45c. The reflected light ray 45c continues to propagate through the optical element 104 until undergoing a final reflection from the interface region 108 so as to be reflected as reflected light ray 45d toward the surface 105d. The reflected light ray 45d reaches a light collection/dissipation component 110, associated with the surface 105d of the optical element 104, which collects and or dissipates the intensity associated with the light ray 45d. The light collection/dissipation component 110 can be deployed at the surface 105d and may be implemented in various ways, including, for example, as an absorber or diffuser. Absorbers and diffusers are well-known to those of ordinary skill in the art. When implemented as an absorber, the light collection/dissipation component 110 may be implemented, for example, as a layer of light absorbing material, e.g., black light absorbing paint, applied to or deposited on the surface 105d.

The designs parameters of the optical arrangement 102, in particular the angle α, and the refractive indices of the interface region 108 and the optical elements 104, 106, can be selected in order to produce a critical angle $\theta_c$ that will ensure that all light rays that are incident to the optical arrangement 102 at AOIs in the first given range of incident angles are coupled into the optical arrangement 102 by internal reflection and are collected and/or dissipated at the light collection/dissipation component 110 so as to prevent such light rays from entering the LOE 12 and being coupled out of the LOE 12 by the partially reflective surfaces 30 toward the eye 36 (where such coupled out light rays are manifested as external scene ghost images).

As mentioned, the optical elements 104, 106 are preferably formed from a high index material, preferably having refractive index qi in the range of 1.5-1.9, and the interface region 108 is preferably formed from a low index material, preferably having refractive index 112 in the range of 1-1.35. As is known in the art, the critical angle $\theta_c=\sin^{-1}(\eta_2/\eta_1)$. Accordingly, using the above example ranges of $\eta_1$ and $\eta_2$, the critical angle can take on values in the range between approximately 33.7° (for $\eta_1=1.8$ and $\eta_2=1$) and 60.1° (for $\eta_1=1.5$ and $\eta_2=1.3$).

Figure 10:
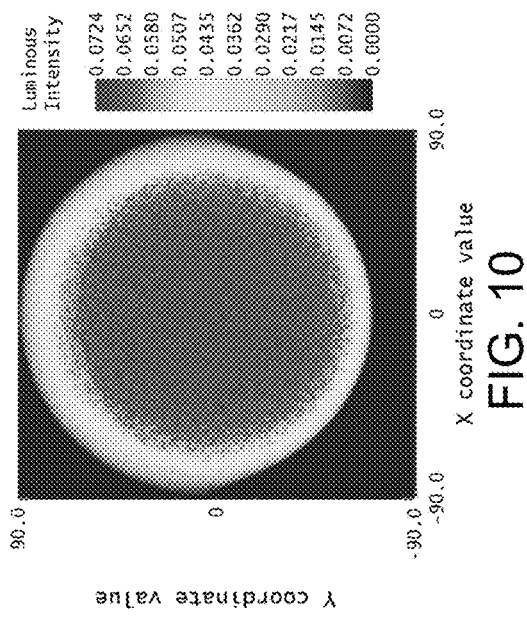
FIG. 10 is a plot of a heat map of the light intensity distribution for light rays that impinge on the optical arrangement of FIGS. 5 and 6 over a given range of incident angles.

FIG. 10 illustrates a heat map of the light intensity distribution for light rays in the first given range of incident angles that impinge on the optical arrangement 102 of FIGS. 5 and 6, and in which the optical elements 104, 106 are constructed from a material having a refractive index of 1.59, the interface region 108 has a refractive index of 1.1, and α=2.5. The heat map shows the intensity distribution of a detector deployed in association with the surfaces 105b, 107b to collect light from a point source with Lambertian distribution deployed in association with the surfaces 105a, 107a. The distribution of light in the vertical axis has a span of 180°, and is truncated at one side along the horizontal axis (representing the span of the interface region 108). Light that is incident to the optical arrangement 102 (in this case the surface 107a of the optical element 106) at AOIs greater than 71° are coupled into the optical arrangement 102 by internal reflection and are deflected by interface region 108 away from the LOE 12 (and toward the light collection/dissipation component 110). In general, the optical parameters of the optical arrangement 102 (e.g., a, the refractive index of the interface region 108, the refractive index of the optical elements 104, 106, etc.) can be selected in order to mitigate the effects of unwanted light rays that are incident to the optical arrangement 102 (i.e., the surface 105a of the optical element 104) at a first given range of incident angles. The first range of incident angles is typically 56°-86°, but may vary depending on the particular configuration of the optical device. For example, in certain optical configurations the first range of incident angles is 70°-86°, while in yet other configurations is 55°-86°. The optical parameters of the optical arrangement 102 can also be selected such that light rays that are incident to the optical arrangement 102 (i.e., the surface 105a of the optical element 104) at a second given range of incident angles (outside of the first range), typically in the range of −90°-45°, are largely unaffected by the optical arrangement 102 (as previously discussed with example ray 60).

Figure 11:
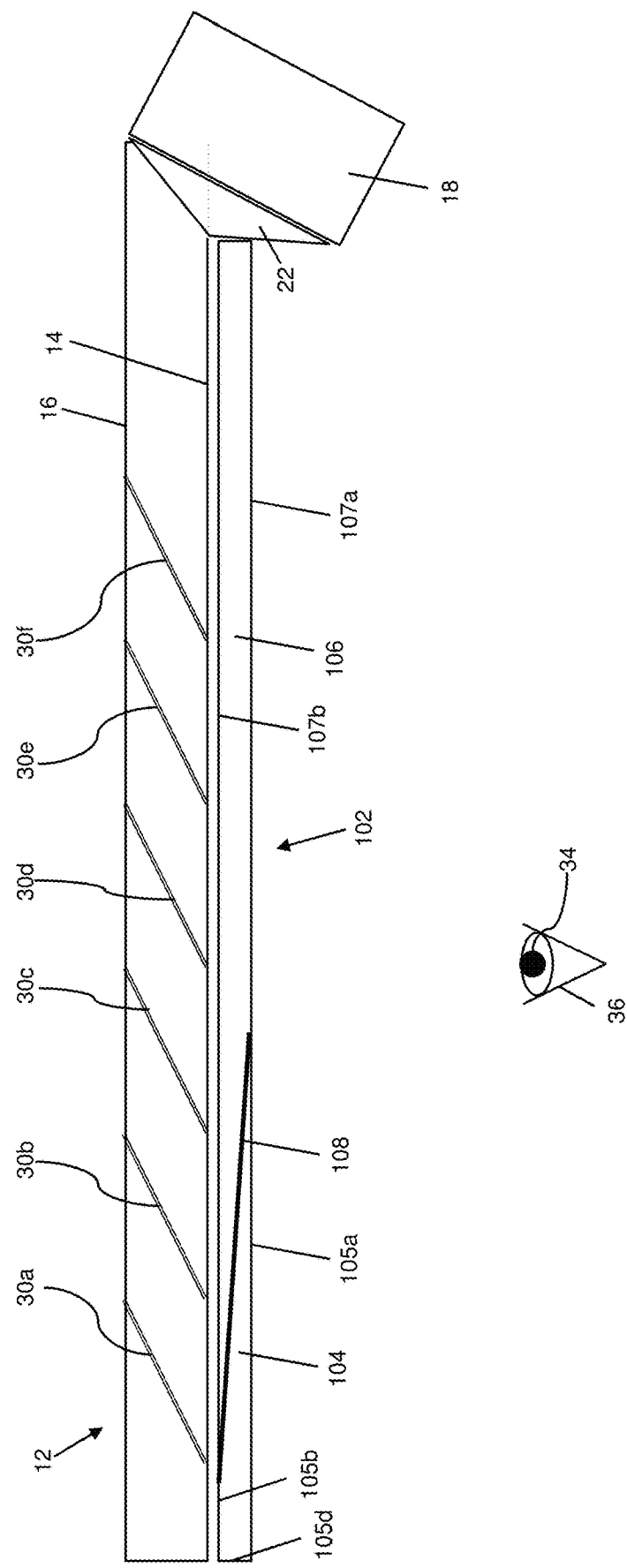
FIG. 11 is a schematic side view similar to FIG. 5, but with the optical arrangement associated with the rear face of the LOE.

Referring now to FIG. 11, there is shown the optical arrangement 102 deployed at the face 14 in order to combat/mitigate ghost images that are caused by light sources in an external scene that is at the rear of the LOE 12 (i.e., when the face 14 is in facing relation to the external scene having the light source, as in FIG. 3). Here, the structure of the optical arrangement 102 is nearly identical to the structure previously described with reference to FIGS. 5-9, with a few key differences. First, and most notably, the optical arrangement 102 is deployed at the face 14 via an optical coupling between the face 16 and the surfaces 105b, 107b. Second, the deployment configuration illustrated in FIG. 11 may require truncation of the optical element 106 (compared to the deployment configuration illustrated in FIG. 5) along the length dimension (spanned in the direction between the proximal and distal ends of the LOE 12, i.e., the horizontal axis) so as to accommodate the optical coupling-in configuration 22. Third, since the optical arrangement 102 is deployed to mitigate ghost that would arise from light sources at the rear of the LOE 12, the interface region spans the entirety of the last few partially reflective surfaces (in this example, the partially reflective surfaces 30a, 30b), and spans at least part of the subsequent partially reflective surface (in this example, the partially reflective surface 30c and spans the entirety of the partially reflective surfaces 30b, 30c. This deployment prevents light rays that are incident to the optical arrangement 102 at a first given range of incident angles from being reflected from the last two partially reflective surfaces 30a, 30b and reaching the eye 36.

The general operating principles of the optical arrangement 102 in the deployment configuration illustrated in FIG. 11 are the same or similar to the operating principles in the deployment configuration illustrated in FIG. 5. In FIG. 11, light from a source (in the external scene) deployed in association with the face 14 and near the image projector 18 that is incident to the surface 105a in a given range of AOIs is coupled into the optical arrangement 102 via the surface 105a of the optical element 104 and is reflected at the interface region 108 by total internal reflection so as to be reflected back toward the surface 105a as a reflected light ray. This reflected light ray is then reflected at the surface 105a back toward the interface region 108, which reflects the reflected light ray toward the surface 105d which has a light collection/dissipation component deployed thereon and/or associated therewith.

As should be apparent, the deployment configurations illustrated in FIGS. 5 and 11 can be used in combination in order to combat/mitigate the effects of a first set of light sources in an external scene at the front side (i.e., face 16) of the LOE 12 and a second set of light sources in an external scene at the rear side (i.e., face 14) of the LOE 12. In other words, a first optical arrangement 102 can be deployed in association with the face 16 (as in FIG. 5) and a second optical arrangement 102 can be deployed in association with the face 14 (as in FIG. 11).

Figure 12:
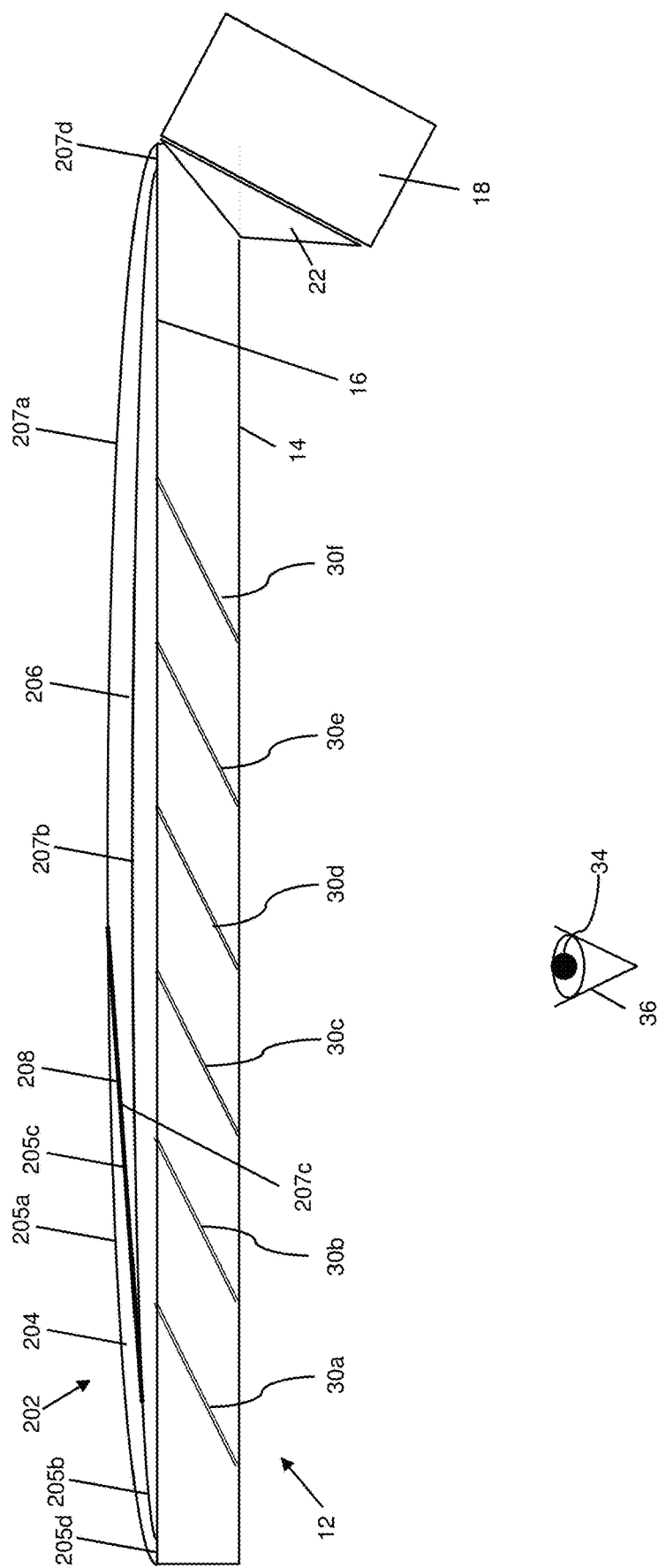
FIG. 12 is a schematic side view of an optical arrangement that deflects ghost-image-causing light rays according to another embodiment of the present invention, having pairs of curved major surfaces.

Referring now to FIG. 12, there is shown a light deflecting optical arrangement 202 according to another embodiment of the present disclosure. Similar to the optical arrangement 102, the optical arrangement 202 is formed from correspondingly configured first and second optical components 204, 206 that are optically coupled to each other (and placed adjacent to each other) to define an interface region 208. As will be discussed, unlike the optical components 104, 106 of the previously described embodiments, the optical components 204, 206 have curved major surfaces such that when the optical components 204, 206 are coupled to each other the optical arrangement 202 forms a lens-like shape having two contiguous curved major surfaces.

As illustrated, the first optical element 204 includes a plurality of surfaces including at least four major surfaces (i.e., faces), designated 205a, 205b, 205c, 205d. The surfaces 205a and 205b are concave curved surfaces and convex curved surfaces, respectively. Similar to the optical element 102, the surface 205a is longer than the surface 205b, and the surface 205c extends between respective first ends of two surfaces 205a, 205b and is oblique to the surfaces 205a, 205b.

The surface 205d extends between respective second ends of two surfaces 205a, 205b (opposite the first ends) and is preferably (but not necessarily) parallel to the faces 14, 16 of the LOE 12 and provides part of an optical coupling between the optical arrangement 202 and the LOE 12. In particular, the surface 205d optically couples the optical arrangement 202 to a portion of the face 16 at or near the distal end of the LOE 12.

The second optical element 206 includes a plurality of surfaces (i.e., faces) including at least four major surfaces, designated 207a, 207b, 207c, 207d. The surfaces 207a and 205b convex curved surfaces and concave curved surfaces, respectively. Similar to the optical element 102, the surface 207b is longer than the surface 207a (and the length of the surface 207b is greater than the length of the surface 205a, and the length of the surface 207a is greater than the length of the surface 205b). The surface 207c extends between respective first ends of two surfaces 207a, 207b and is oblique to the surfaces 207a, 207b.

The surface 207d extends between respective second ends of two surfaces 207a, 207b (opposite the first ends) and is preferably (but not necessarily) parallel to the faces 14, 16 of the LOE 12, and is most preferably coplanar with the surface 205d. The surface 207d provides part of the optical coupling between the optical arrangement 202 and the LOE 12. In particular, the surface 207d optically couples the optical arrangement 202 to a portion of the face 16 at or near the proximal end of the LOE 12.

Since the surfaces 205a, 205b, 207a, 207b each have a degree of curvature, the oblique angles between the surface 205c and the surfaces 205a, 205b, and the oblique angles between the surface 207c and the surfaces 207a, 207b, are mixed angles. Accordingly, the oblique angle between the surfaces 205a, 205c is measured between the surface 205c and the tangent to the surface 205a at the point of intersection between the surfaces 205a, 205c. Similarly, the oblique angle between the surfaces 205b, 205c is measured between the surface 205c and the tangent to the surface 205b at the point of intersection between the surfaces 205b, 205c. Similarly, the oblique angle between the surfaces 207a, 205c is measured between the surface 207c and the tangent to the surface 207a at the point of intersection between the surfaces 207a, 207c. Similarly, the oblique angle between the surfaces 207b, 207c is measured between the surface 207c and the tangent to the surface 207b at the point of intersection between the surfaces 207b, 207c. These oblique angles define the oblique deployment of the interface region 208, similar to as in the optical arrangement 102 described above.

As can be seen in FIG. 12, the optical coupling (adjacent placement) of the optical elements 204, 206 preferably results in the surfaces 205b and 207b forming parts of a contiguous concave curved surface of the optical arrangement 202, and the surfaces 205a and 205b forming part of a contiguous convex curved surface of the optical arrangement 202.

A light collection/dissipation component (similar to the light collection/dissipation component 110 of FIG. 9) may be associated with the portions of the major surface 205a that are close to the surface 205d so as to collect or dissipate the unwanted light that propagates through the optical element 204 by internal reflection.

Figure 13:
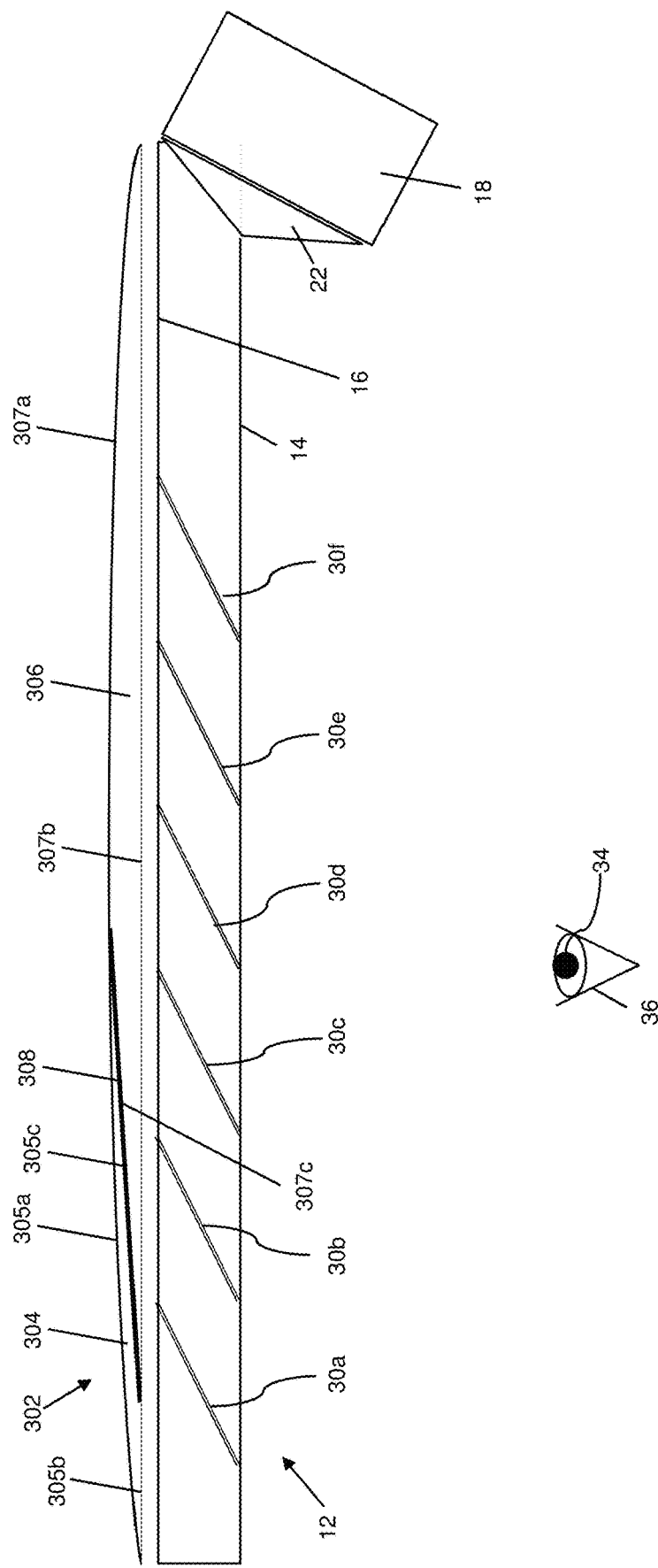
FIG. 13 is a schematic side view of an optical arrangement that deflects ghost-image-causing light rays according to another embodiment of the present invention, having pairs of curved and planar major surfaces.

FIG. 13 shows a light deflecting optical arrangement 302 according to another embodiment of the present disclosure. Similar to the optical arrangements 102, 202, the optical arrangement 302 is formed from correspondingly configured first and second optical components 304, 306 that are optically coupled to each other (and placed adjacent to each other) to define an interface region 308. The first optical element 304 includes a plurality of surfaces, but unlike the optical elements of the optical arrangements 102, 202, the optical element 304 is primarily defined by three major surfaces (i.e., faces) in the plane of the paper, designated 305a, 305b, 305c. Similar to the surface 205a, the surface 305a is a convex curved surface. The surface 305b is a planar surface, and the surface 305c extends between respective first ends of two surfaces 305a, 305b and is oblique to the surfaces 305a, 305b. The surfaces 305a, 305b are joined at respective second ends of two surfaces 305a, 305b. A light collection/dissipation component may be associated with the portions of the major surface 305a that are close to the surface 305b so as to collect or dissipate the unwanted light that propagates through the optical element 304 by internal reflection.

The second optical element 306 is also primarily defined by three major surfaces (i.e., faces) in the plane of the paper, designated 307a, 307b, 307c. Similar to the surface 207a, the surface 307a is a convex curved surface. The surface 307b is a planar surface that is preferably coplanar with the surface 305b. The surface 307c extends between respective first ends of two surfaces 307a, 307b and is oblique to the surfaces 307a, 307b. The surfaces 307a, 307b are joined at respective second ends of two surfaces 307a, 307b.

As can be seen in FIG. 13, the optical coupling (adjacent placement) of the optical elements 304, 306 preferably results in the surfaces 305b and 307b forming parts of a contiguous planar surface of the optical arrangement 202, and the surfaces 305a and 305b forming part of a contiguous convex curved surface of the optical arrangement 202, such that the optical arrangement 302 has a general plano-convex structure.

In the embodiment illustrated in FIG. 13, the optical arrangement 302 is deployed at the face 16 via an optical coupling between the face 16 and the surfaces 305b, 307b. In certain preferred but non-limiting implementations, the optical coupling is effectuated by a mechanical coupling whereby the optical arrangement 302 is mechanically positioned with the surfaces 305b, 307b adjacent to the face 16 with an air gap maintained between the surfaces 305b, 307b and the face 16 (similar to as in the embodiments described with reference to FIGS. 5-9).

Although not shown in the drawings, the optical arrangements 202, 302 of FIGS. 12 and 13 can be deployed in association with the face 14 (similar to as in FIG. 11) so as to combat/mitigate ghost images that are caused by light sources in an external scene that is located at the rear of the LOE 12. It is noted that such a deployment may require modifications to the optical arrangement 202, similar to the modifications of the optical arrangement 102 described in the deployment configuration of FIG. 11 (e.g., truncation of the optical elements 206, 306, and placement of the interface regions 208, 308 in relation to the partially reflective surfaces). It is noted that typically if an optical surface with optical power is introduced between the LOE 12 and the eye 36, the optical surface is a plano-concave surface. The plano-concavity of the optical surface enables imaging of the illumination (e.g., beam 20 in FIG. 1), coupled-out from the LOE 12 via the optical coupling-out configuration 30, at a closer distance than infinity.

Although the embodiments described thus far have pertained to a light deflecting optical arrangement having two adjacently placed correspondingly configured optical elements that define an interface region having a linear surface profile, other embodiments are possible in which the surface profile of the interface region is non-linear. FIGS. 14 and 15 illustrate examples of optical arrangements having such non-linear interface regions.

Referring first to FIG. 14, there is shown a light deflecting optical arrangement 402 according to embodiments of the present disclosure that is similar to the optical arrangement 102 but having an interface region with a non-linear surface profile. Like components of the optical arrangement 402 are labeled similar to those of the optical arrangement 102, except the labels of the components of the optical arrangement 402 begin with the numeral "4". The optical arrangement 402 is nearly identical to the optical arrangement 102 in structure and operation, except that the surfaces 405c, 407c are curved surfaces (i.e., have a degree of curvature) such that the interface region 408 has a non-linear surface profile, preferably a two-dimensional (2D) or one-dimensional (1D) convex or semi-convex surface profile. In such embodiments, the surface 405c is generally convex or semi-convex, and the surface 407c is generally concave or semi-concave. A light collection/dissipation component may be associated with the major surface 405d so as to collect or dissipate the unwanted light that propagates through the optical element 404 by internal reflection.

FIG. 15 illustrates a light deflecting optical arrangement 502 according to another embodiment of the present disclosure, that is similar to the optical arrangement 302. Like components of the optical arrangement 502 are labeled similar to those of the optical arrangement 302, except the labels of the components of the optical arrangement 502 begin with the numeral "5". The optical arrangement 502 is nearly identical to the optical arrangement 302 in structure and operation, except that the surfaces 505c, 507c are curved surfaces (similar to the optical arrangement 402) such that the interface region 508 has a non-linear surface profile, preferably a convex or semi-convex surface profile. A light collection/dissipation component may be associated with the portions of the major surface 505a that are close to the surface 505b so as to collect or dissipate the unwanted light that propagates through the optical element 504 by internal reflection.

As a result of the structure of the optical arrangements 402, 502, light rays that are incident to the surfaces 405a, 505a are subjected to a varying surface profile of the interface regions 408, 508, such that the AOI of an incident ray changes with respective to position (i.e., the position of the point of incidence at the interface region). As a result, the optical arrangements 402, 502 are able to deflect light rays over a larger FOV, since the angular distribution of deflected light rays increases as the curvature of the interface region steepens (in the direction from the proximal end to the distal end of the LOE 12 in the drawings).

Figure 16:
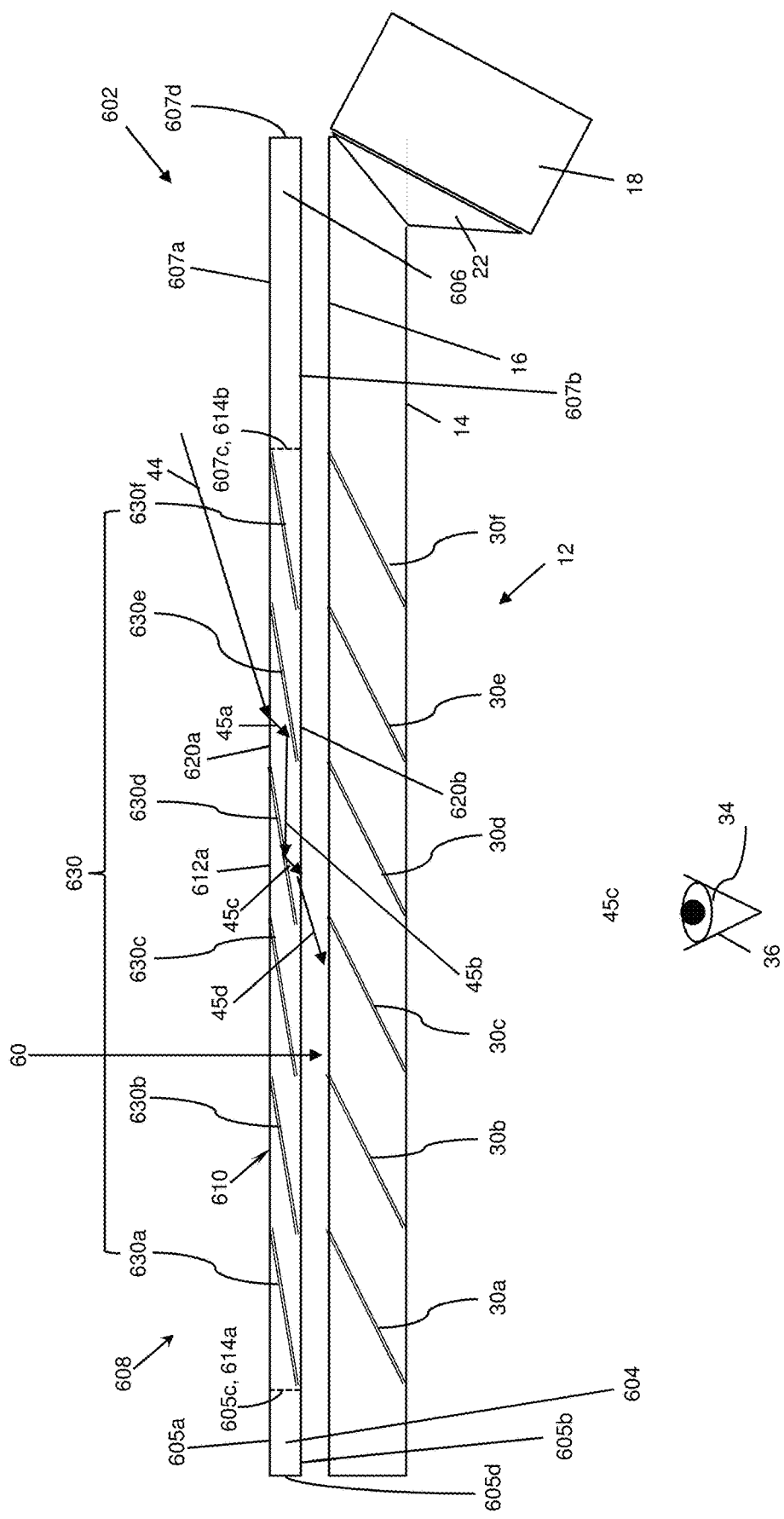
FIG. 16 is a schematic side view of an optical arrangement that deflects ghost-image-causing light rays according to another embodiment of the present invention, having an interface region formed as a light-transmitting substrate employing a set of partially reflective surfaces.

Although the embodiments described thus far have pertained to interface regions formed as an air gap or a layer of transparent low index material (e.g., a layer of optical adhesive, a layer of solid dielectric material, or a thin transparent plate of low-index material), other embodiments are possible in which the interface region has a more definitive optical structure, for example in the form of a series of partial reflectors embedded within a substrate. FIG. 16 illustrates a non-limiting implementation of a light deflecting optical arrangement 602 according to such embodiments. The optical arrangement 602 is similar to the optical arrangement 102 but includes an interface region having a series of partially reflective surfaces. Like components of the optical arrangement 602 are labeled similar to those of the optical arrangement 102, except the labels of the components of the optical arrangement 602 begin with the numeral "6".

In the illustrated non-limiting implementation, the optical arrangement 602 includes two optical elements 604, 606 having an interface region 608 formed between them. The interface region 608 is formed as a light-transmitting substrate 610 having first and second pairs of parallel major external surfaces 612a, 612b, 614a, 614b and includes a sequence of partially reflective surfaces 630a, 630b, 630c, 630d, 630e, 630f (collectively designated 630) deployed within the substrate 610 extending between the surfaces 612a, 612b and oblique to the surfaces 612a, 612b.

Each of the two optical elements 604 and 606 includes a plurality of surfaces including at least four planar major surfaces (i.e., faces), designated 605a, 605b, 605c, 605d and 607a, 607b, 607c, 607d, respectively. The surfaces 605a, 605b are mutually parallel and are respectively coplanar with mutually parallel surfaces 607b, 607a. In certain non-limiting implementations, the surfaces 605a, 605b are orthogonal to the surfaces 605c, 605d, and the surfaces 607a, 607b are preferably orthogonal to the surfaces 607c, 607d. In such implementations, the interface region 608 is formed as a rectangular slab-type substrate 610 deployed between the optical elements 604, 606, with one of the surfaces 614a of the second pair of surfaces optically coupled to the surface 605c and the other of the surfaces 614b of the second pair optically coupled to the surface 607c. In other non-limiting implementations, the surfaces 605c, 607c are oblique to the surfaces 605a, 605b, 607a, 607b.

The surfaces 605a, 612a, 607a form part of a single contiguous surface (designated 620a) that is parallel to another single contiguous surface (designated 620b) formed by the surfaces 605b, 612b, 607b.

In yet other sometimes more preferable non-limiting implementations, the optical arrangement 602 is generally formed as a unitary rectangular slab-type substrate having parallel surfaces 620a, 620b, and having the partially reflective surfaces 630 deployed within the slab-type substrate extending between the surfaces 620a, 620b and oblique to the surfaces 620a, 620b. Such unitary implementations may have certain advantages over non-unitary implementations in terms of reduced manufacturing complexity.

Regardless of the implementation, the optical arrangement 602 is deployed such that the partially reflective surfaces 630 are associated with the optical coupling-out configuration 30. In preferred but non-limiting implementations, the partially reflective surfaces 630 span the entirety of the optical coupling-out configuration 30, and there is a one-to-one relationship between the partial reflectors in each of the sets of partially reflective surfaces 30, 630. This is illustrated in FIG. 16, where the projection of each partially reflective surface of the partially reflective surfaces 630 spans the projection of a respective one of the partially reflective surfaces 30. For example, the projection of the partially reflective surface 630a spans the projection of the partially reflective surface 30a, where the projection plane is parallel to the planes of the surfaces 620a, 620b, 14, 16.

It is noted that the thickness of the substrate 610 (measured between the surfaces 620a, 620b) is less than the thickness of the LOE 12. Thus, the oblique angles at which the partially reflective surfaces 30 and 630 are deployed are different.

The following paragraphs described the preferred optical properties of the partially reflective surfaces 630. First, the partially reflective surfaces 630 are preferably reflective for high AOI and transmissive at low AOI (where AOI is measured normal to the plane of the partially reflective surfaces 630). This optical property is similar to that of the interface regions discussed in previously described embodiments, where light rays impinging on the interface region at angles greater than the critical angle $\theta_c$ are reflected at the interface region.

In addition, in order to prevent light from being reflected into guiding by one of the partially reflective surfaces 630 and reflected back to the original direction by another of the reflective surfaces 630 (this phenomenon being referred to as "double reflection"), it may be advantageous to implement the partially reflective surfaces 630 as scattering surfaces. The double reflection is illustrated schematically in FIG. 16, in which representative incident light ray 44 is coupled into the optical arrangement 602 via the surface 620a as refracted light ray 45a. The light ray 45a impinges on one of the surfaces 630e and is reflected as reflected light ray 45b, which impinges on an adjacent one of the surfaces 630d and is reflected as reflected light ray 45c. The light 45c is then refracted out of the optical arrangement 602 via the surface 620b as light ray 45d. By employing scattering properties, the double reflected light will also be double scattered to lose its original direction. As such, the partially reflective surfaces 630 have reflective and scattering/diffusive properties for larger AOIs.

However, the partially reflective surfaces 630 should also be specularly transparent for smaller AOIs. Constructing partially reflective surfaces having diffusive-reflective properties at high AOIs and specular transparency at low AOIs can be achieved by depositing a very thin layer of low refractive index material on a very rough diffused glass. For example, a layer of Magnesium fluoride ($MgF_2$) having thickness of approximately 1 μm can be deposited on diffused glass having a surface roughness (Ra) of approximately 10 μm to construct the partially reflective surfaces 630.

In addition, if the material of the optical arrangement 602 is partially absorptive, then light propagating straight through (such as light ray 60) the optical arrangement 602 will be slightly absorbed, while the light ray 44 (and the associated refracted and reflected rays 45a-45c) will propagate a much longer distance inside the absorbing material thereby significantly decreasing the intensity of the light rays 44, 45a-45d. An example of such a partially absorptive material is a photochromic material which becomes darker (i.e., absorbs more) in the presence of bright sources. Thus, for instance, when the optical device is deployed for outdoor use in the presence of sunlight impinging on the optical arrangement at particular AOIs, when the ghost reflection could be extremely bright, the photochromic material will transition to black and decrease the ghost images dramatically. In addition, if the surfaces 630 are partially absorbing, the light being reflected through these surfaces 630 would be absorbed twice while light passing through the surfaces 630 would be absorbed only once. It is noted that the difference in the transmission of ray 60 and the blocking of ray 44, 45a-45d is somewhat limited. Therefore, optical structures which can provide better discrimination between these light rays may be preferred.

Figure 17:
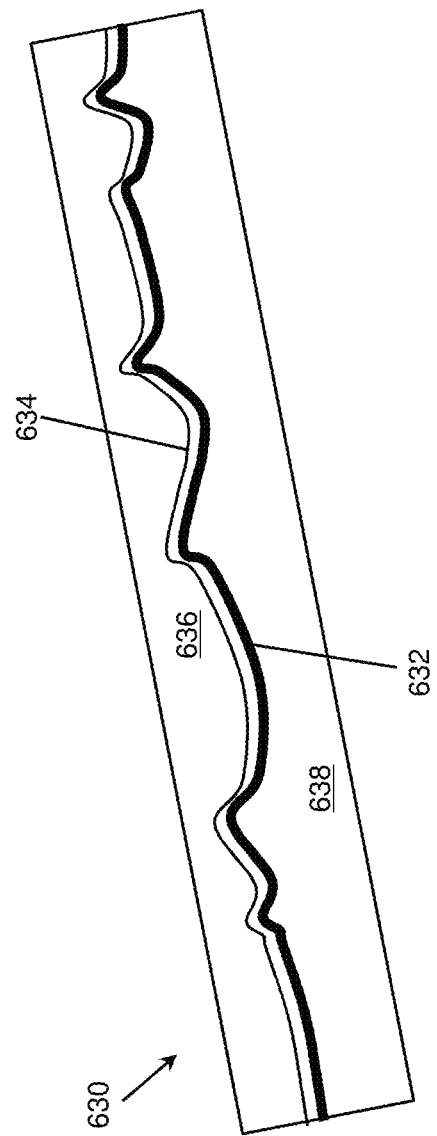
FIG. 17 is a schematic side view illustrating the structure of a representative one of the partially reflective surfaces of the interface region of FIG. 16.

FIG. 17 illustrates an example of such a sometimes preferred optical structure. Here, a partially reflective surface (representative of the partially reflective surfaces 630) is constructed by sandwiching a rough surface 632 (represented schematically by a curving line intended to represent the surface roughness) coated with a thin layer of low refractive index material 634 (such as $MgF_2$) between two transparent layers (optical elements) 636, 638 having approximately the same high refractive index that is larger than the refractive index of the material 634. This will result in a clear specular transparent surface at low AOIs and a diffused-reflective surface for high AOIs.

The transparent layers 636, 638 are optically coupled to each other, thereby defining an interface region in the form of the surface 632 coated with the material 634. Since each of the partially reflective surfaces 630 is implemented by sandwiching a low-index coated rough surface between a pair of high-index optical elements, the interface region 608 includes a plurality of interface regions (i.e., one interface region for each one of the partially reflective surfaces 630).

Figure 18:
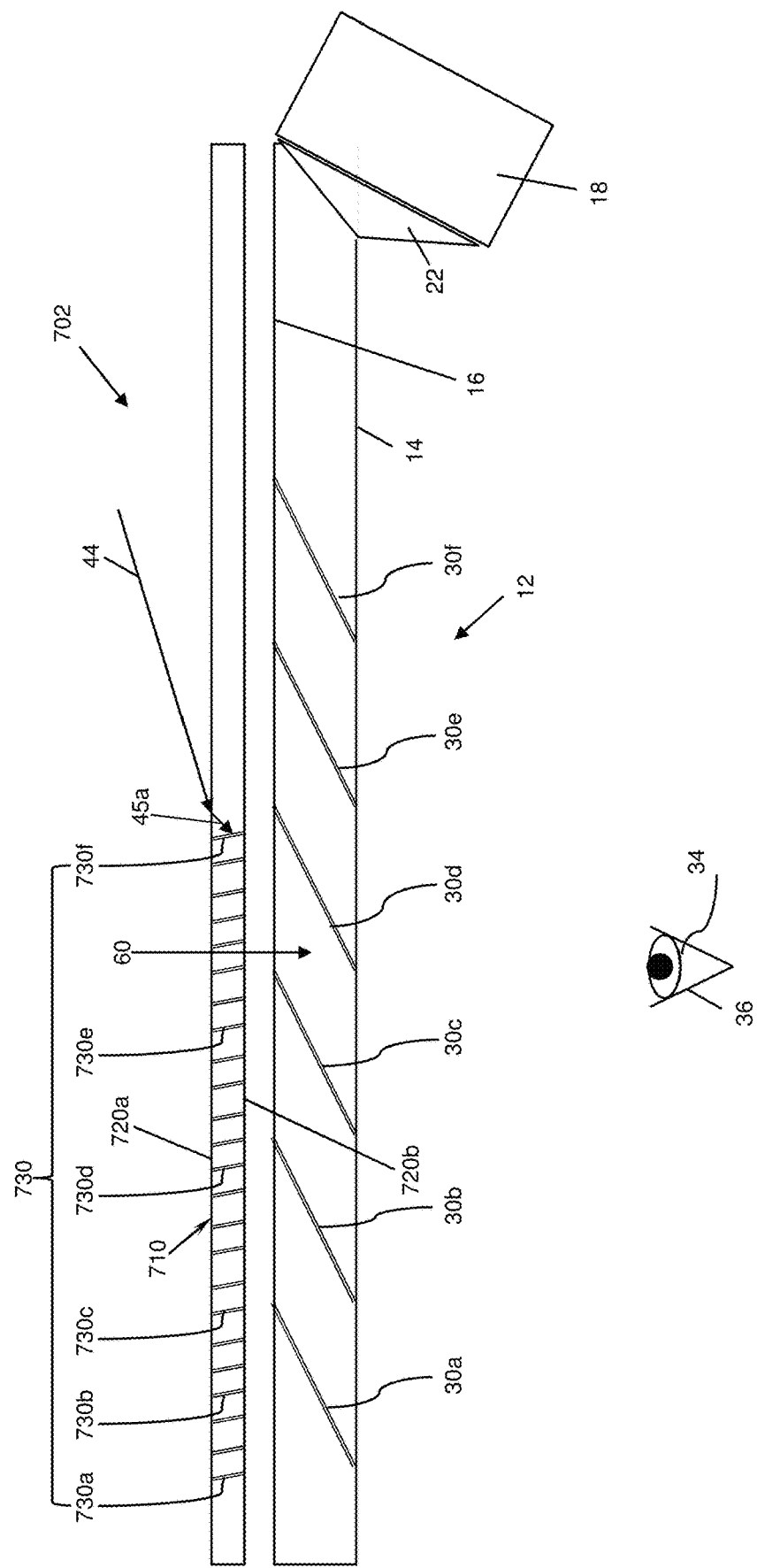
FIG. 18 is a schematic side view of an optical arrangement similar to FIG. 16, but with the interface region having a plurality of mutually parallel absorbing surfaces.

FIG. 18 illustrates a non-limiting implementation of an optical arrangement 702 for combatting ghost images according to another embodiment of the present disclosure, that is similar to the optical arrangement 602. Like components of the optical arrangement 702 are labeled similar to those of the optical arrangement 602, except the labels of the components of the optical arrangement 702 begin with the numeral "7". Similar to the optical arrangement 602, the optical arrangement 702 employs a set of mutually parallel surfaces 730 deployed within a light-transmitting substrate 710. However, there are several key differences between the optical arrangements 602 and 702. One key difference is the fundamental optical principle of the surfaces 730. In the present embodiment, the surfaces 730 are absorptive, and block all light passing through the surfaces 730. This is illustrated schematically in FIG. 18, in which incident light ray 44 is coupled into the optical arrangement via the surface 720a as refracted light ray 45a. The light ray 45a impinges on one of the surfaces 730 and is absorbed by that surface, thereby preventing the light ray 44 from reaching the LOE 12. Thus, the optical arrangement 702 is not strictly a "light deflecting" optical arrangement, but is rather a "light absorbing" optical arrangement.

Another key difference is that the surfaces 730 are deployed at a larger inclination angle as compared to the surfaces 630, and are deployed in an opposing direction to the partially reflective surfaces 30. The large inclination angle enables a greater number of surfaces to be packed into the substrate 710. This is clearly illustrated in FIG. 18, which shows surfaces 730a-730f as merely examples of a few of the plurality of parallel surfaces 730. The location of the surfaces 730 relative to the partially reflective surfaces 30, as well as the deployment angle of the surfaces 730 ensures that the surfaces 730 do not disturb the user/viewer. As illustrated, the surfaces 730 are positioned/located only at the left area of the LOE 12 (in association with the partially reflective surfaces 30 at or near the distal end of the LOE 12). The large inclination angle, typically in the range of 75°-85° (measured relative to the plane of the surface 720b), and the opposing slant direction to the partially reflective surfaces 30, in combination with the deployment location of the surfaces 730, ensures that the cross-section of the surfaces 730 for external scene light rays impinging on the surface 720a at angles close to normal (e.g., light ray 60) is very small. Thus, the majority of light from the external scene that impinges on the surface 720a at angles close to normal will pass straight through the optical arrangement 702.

The surfaces 730 can be implemented using a structure similar to as previously described with reference to FIG. 17, expect here the material 634 should be absorptive with similar refractive index to that of the transparent layers 636 and 638.

It is noted that regardless of the implementation of the optical arrangement, the optical arrangement preferably spans across the entire width of the LOE 12 (i.e., spans between the proximal end and the distal end of the LOE 12) so as to ensure that the observer has an unobstructed view of the external scene.

The optical devices according to the embodiments of the present disclosure can be used to advantage when implemented in an eye-glasses form factor with a head-mounted mechanical body implemented as an eye-glasses frame with side arms for engaging the ears of the observer (viewer). Examples of such eye-glasses form factors can be found in a number of co-owned patent documents, such as U.S. Pat. No. 8,432,614, whose disclosure is incorporated by reference in its entirety herein. In such non-limiting implementations, the image projector 18 and optical coupling-in configuration 22 are located near the temple of the eye-glasses frame. It should be noted that other form factors, such as helmet-mounted form factors, and other head-up display and near-eye display form factors also clearly fall within the scope of the present invention.

It may be particularly advantageous to deploy a second optical arrangement at or near one of the sidearms of the eye-glasses frame so as to prevent unwanted light rays originating from the rear and temple-side of the observer from reaching the EMB. FIG. 19 illustrates a second optical arrangement 102' deployed according to such a deployment configuration. In the illustrated deployment configuration, the second optical arrangement 102' is similar to the first optical arrangement 102, with like components of the second optical arrangement 102' labeled similar to those of the first optical arrangement 102, except the labels of the components of the second optical arrangement 102' are appended with a "prime", (').

The second optical arrangement 102' is deployed at the proximal end of the LOE 12 (i.e., near the image projector 18 and optical coupling-in configuration 22) at an orientation that is orthogonal to the LOE 12 (and orthogonal to the optical arrangement 102) and with the surfaces 105b', 107b' in facing relation with the eye 36. The orthogonal orientation between the optical arrangement 102' and the LOE 12 generally refers to the orthogonality of the directions of elongation of the optical arrangement 102' and the LOE 12. In the illustrated embodiments, the LOE 12 (and the first optical arrangement 102) has a direction of elongation that arbitrarily corresponds to the horizontal axis, and the second optical arrangement 102' has a direction of elongation that corresponds to the vertical axis.

Note that since the second optical arrangement 102' is deployed at or near one of the sidearms orthogonal to the LOE 12, the geometry of the optical element 104' may differ from the geometry of the optical element 104. Notably, the lengths of the optical elements 104', 106' (measured along the vertical axis in the figure) can be truncated compared to the lengths of the optical elements 104, 106. In addition, the lengths of the surfaces 105a', 105b' (measured along the vertical axis in the figure) are preferably considerably shorter than the corresponding lengths of the surfaces 105a, 105*b*. In certain embodiments, the optical element 104' is defined by three major surfaces so as to form a three-sided prism in the plane of the paper (i.e., the surface 105*b*' has an effective length of 0). Furthermore, the measure of the oblique angle between the surfaces 105*a*', 105*c*' may differ from the measure of the oblique angle between the surfaces 105*a*, 105*c*.

It is noted that although the two orthogonally oriented optical arrangements in FIG. 19 are shown as being implemented as the optical arrangement described with reference to FIG. 5, the two orthogonally oriented optical arrangements can be implemented according to any of the previously described optical arrangements. Furthermore, the two orthogonally oriented optical arrangements do not necessarily need to be of the same implementation. For example, the first optical arrangement can be implemented as the optical arrangement described with reference to FIG. 12, and the second optical arrangement can be implemented as the optical arrangement described with reference to FIG. 5.

Within the context of implementation of the optical device in an eye-glasses form factor or other head-up display and near-eye display form factors, the optical arrangements that are formed from optical elements having curved major surfaces (such as the optical arrangements 202, 302, 502) may provide advantages to observers having vision impairments. For example, the optical arrangements 202, 302, 502 can be formed as a lens, or formed as part of a lens, whereby the surfaces 205*a*, 207*a*, 305*a*, 307*a*, 505*a*, 507*a* can apply corrective power to light emanating from the external scene that in the absence of the optical arrangements would impinge on the face 16 at relatively small AOIs (e.g., AOIs in the range of 0°-34°, thereby improving the observer's view of the external scene. It is noted that in the illustrated non-limiting implementations, the optical arrangements 202, 302, 502 have power of 0.5D when deployed between the external scene and the LOE 12 (as in FIGS. 12 and 13), and have power of −0.5D if deployed between the LOE 12 and the eye (such as in FIG. 11).

Although the optical devices according to embodiments of the present disclosure have been described thus far within the context of the optical coupling-out configuration 30 implemented as a set of partially reflective surfaces 30, the set partially reflective surfaces 30 is merely illustrative of one non-limiting implementation of an optical coupling-out configuration, and other optical coupling configurations can be used to couple image light out of the LOE 12. The optical coupling-out configuration may be any optical coupling arrangement which deflects part of the image incident light already propagating within the LOE 12 by internal reflection to an angle such that the deflected part of the image incident light exits the LOE 12. Other examples of such suitable optical coupling arrangements include, but are not limited to, one or more diffractive optical elements deployed on either of the faces 14, 16, and a beamsplitter arrangement. Such optical coupling arrangements may also induce ghosts in instances where incoming light from an external scene impinges on the external faces 14, 16 at a particular range of grazing angles. Accordingly, the light deflecting or absorbing optical arrangements according to the embodiments of the disclosure described above are also suitable for mitigating ghost images when used in combination with light-transmitting substrates that utilize such diffractive or beam-splitting optical coupling arrangements.

It is further noted that although the ghost mitigation techniques discussed herein have thus far been described within the context of parallel-faced slab-type optical wave guides, the light deflecting or absorbing optical arrangements according to the embodiments described herein can be used in combination with other optical waveguide architectures. As discussed in the background section, aperture multiplication in one dimension has been developed based on a parallel-faced slab of transparent material within which the image propagates by internal reflection. It is noted that aperture multiplication in two dimensions has also been developed using various optical waveguide configurations. In one example configuration, two-dimensional aperture expansion is effectuated by way of first and second optical waveguides. The first optical waveguide has two pairs of parallel major external surfaces that form a rectangular cross-section. A first set of mutually parallel partially reflective surfaces traverse the first optical waveguide oblique to a direction of elongation of the optical waveguide. The second optical waveguide, optically coupled to the first optical waveguide, has a pair of parallel major external surfaces forming a slab-type waveguide. A second set of mutually parallel partially reflective surfaces traverse the second optical waveguide oblique to the major external surfaces of the second optical waveguide. In addition, the planes containing the first set of partially reflective surfaces are preferably oblique to the planes containing the second set of partially reflective surfaces. The optical coupling between the two optical waveguides, and the deployment and configuration of the two sets of partially reflective surfaces are such that, when an image is coupled into the first optical waveguide with an initial direction of propagation at a coupling angle oblique to both pairs of parallel major external surfaces of the first optical waveguide, the image advances by four-fold internal reflection along the first optical waveguide (i.e., in two dimensions), with a proportion of intensity of the image reflected at the first set of partially reflective surfaces so as to be coupled out of the first optical waveguide and into the second optical waveguide, and then propagates through two-fold internal reflection within the second optical waveguide (i.e., in one dimension), with a proportion of intensity of the image reflected at the second set of partially reflective surfaces so as to be coupled out of the second optical waveguide as a visible image seen by the eye of an observer. Further details of such a two-dimensional aperture multiplier can be found in various patent documents, including, for example, U.S. Pat. No. 10,564,417, which is incorporated by reference in its entirety herein.

The light deflecting or absorbing optical arrangements according to the embodiments of the present disclosure may be deployed in association with one of the major surfaces of the optical waveguides, so as to combat/mitigate ghost images that are caused by light sources in an external scene that is located in front of the one of the major surfaces of the optical waveguides.

In another example configuration, two-dimensional aperture expansion is effectuated by way of first and second slab-type optical waveguides. The first optical waveguide has two pairs of parallel major external surfaces forming a slab-type waveguide. A first set of mutually parallel internal partially reflective surfaces traverse the first optical waveguide at an oblique angle to the two pairs of parallel major external surfaces. The second optical waveguide also has two pairs of parallel major external surfaces. A second set of mutually parallel internal partially reflective surfaces traverse the second optical waveguide at an oblique angle to the two pairs of parallel major external surfaces of the second optical waveguide. In addition, the planes containing the first set of partially reflective surfaces are oblique or perpendicular to the planes containing the second set of partially reflective surfaces. The optical coupling between the two optical waveguides, and the deployment and configuration of two sets of partially reflective surfaces are such that, when an image is coupled into the first optical waveguide, the image propagates through two-fold internal reflection within the first optical waveguide between the external surfaces of one of the pairs of external surfaces in a first guided direction, with a proportion of intensity of the image reflected at the first set of partially reflective surfaces so as to be coupled out of the first optical waveguide and into the second optical waveguide, and then propagates through two-fold internal reflection within the second optical waveguide between the external surfaces of one of the pairs of external surfaces of the second optical waveguide in a second guided direction (oblique to the first guided direction), with a proportion of intensity of the image reflected at the second set of partially reflective surfaces so as to be coupled out of the second optical waveguide as a visible image seen by the eye of an observer. Further details of such a two-dimensional aperture multiplier can be found in various patent documents, including, for example, U.S. Pat. No. 10,551,544, which is incorporated by reference in its entirety herein.

The light deflecting or absorbing optical arrangements according to the embodiments of the present disclosure may be deployed in association with one of the major surfaces of the optical waveguides, so as to combat/mitigate ghost images that are caused by light sources in an external scene that is located in front of the one of the major surfaces of the optical waveguides.

It is noted that although not shown in the drawings, the image projector 18 of the various optical devices described herein generally includes a microdisplay, such as a liquid-crystal on silicon (LCoS), organic light-emitting diode (OLED), and the like, for generating image light, and corresponding collimating optics for collimating the image to infinity. When the microdisplay is implemented a reflective or transmissive display, illumination components (such as one or more LEDs) and illumination optics (such as beamsplitters) are also included in the image projector 18 so as to direct light from the illumination components to the microdisplay, and to direct the image light to the collimating optics.

It is further noted that the coupling prism 22 of the various optical devices described herein is merely illustrative of one non-limiting implementation of an optical coupling-in configuration, and other optical coupling configurations can be used to couple image light from the image projector 20 into the LOE 12. The optical coupling-in configuration may be any optical coupling arrangement which deflects part of the image light into the LOE 12 at an appropriate angle so as to be guided by internal reflection within the LOE 12. Other examples of such suitable optical coupling arrangements include, but are not limited to, reflective surfaces in the form of a coupling-in reflector, and diffractive optical elements.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical device, comprising:
    a light-transmitting substrate having at least two major surfaces for guiding light by internal reflection between the major surfaces;
    an optical coupling-out configuration for coupling the light, guided by internal reflection between the two major surfaces, out of the light-transmitting substrate toward an eye of a viewer; and
    an optical arrangement associated with at least one of the two major surfaces and including a first optical element and a second optical element optically coupled to the first optical element to define an interface region associated with at least a portion of the optical coupling-out configuration, the optical arrangement being deployed such that light rays emanating from an external scene and incident to the optical arrangement at a given range of incident angles are deflected at the interface region so as to be trapped within the first optical element by internal reflection.

2. The optical device of claim 1, wherein the first and second optical elements each have a refractive index that is higher than a refractive index of the interface region.

3. The optical device of claim 1, wherein the interface region is formed as an air gap.

4. The optical device of claim 1, wherein the interface region is formed as a transparent layer of low index material.

5. The optical device of claim 1, wherein the first and second optical components each include a plurality of surfaces and are correspondingly configured and adjacently placed via corresponding surfaces of the plurality of surfaces so as to define the interface region.

6. The optical device of claim 1, wherein the optical arrangement is formed as a lens.

7. The optical device of claim 1, wherein the interface region has a linear surface profile.

8. The optical device of claim 1, wherein the interface region has a non-linear surface profile.

9. The optical device of claim 1, wherein the interface region includes a second light-transmitting substate having a pair of parallel faces and a plurality of partially reflective surfaces deployed within the second light-transmitting substrate oblique to the parallel faces.

10. The optical device of claim 9, wherein each of the partially reflective surfaces includes: a pair of transparent layers and a rough transparent layer coated with a low refractive index material deployed between the pair of transparent layers, wherein each of the pair of transparent layers has a refractive index that is higher than the refractive index of the low refractive index material.

11. The optical device of claim 1, wherein the light rays emanating from the external scene at the given range of angles enter the optical arrangement via a first surface of the first optical element, are reflected at the interface region, are reflected at the first surface of the first optical element, and are reflected at the interface region toward a second surface of the first optical element and away from the light-transmitting substrate.

12. The optical device of claim 11, wherein the second surface of the first optical element is associated with a light collecting or dissipating component.

13. The optical device of claim 1, wherein light rays emanating from the external scene at a range of angles outside of the given range of angles enter the optical arrangement via a first surface of the first optical element, are transmitted by the interface region, exit the optical arrangement via a first surface of the second optical element and pass through the light-transmitting substrate to the eye of the viewer.

14. The optical device of claim 1, wherein the optical arrangement is such that in the absence of the optical arrangement, the light rays emanating from the external scene at the given range of angles enter the light-transmitting substrate and are coupled out of the light-transmitting substrate, by the optical coupling-out configuration, toward the eye of the viewer.

15. The optical device of claim 1, further comprising: a second optical arrangement deployed at an orientation orthogonal to the light-transmitting substrate and at an end of the light-transmitting substrate.

16. The optical device of claim 1, wherein the optical coupling-out configuration includes a plurality of partially reflective surfaces at least partially traversing the light-transmitting substrate, wherein the interface region spans a subset of the partially reflective surfaces located near a distal end of the light-transmitting substrate.

17. An optical device, comprising:
a light-transmitting substrate having a pair of faces for guiding light by internal reflection between the faces;
an optical coupling-out configuration for coupling the light, guided by internal reflection between the faces, out of the light-transmitting substrate toward an eye of a viewer; and
an optical element having a plurality of surfaces including a pair of parallel major surfaces and a third major surface oblique to the pair of parallel major surfaces and associated with at least a portion of the optical coupling-out configuration, wherein an interface region having a refractive index lower than a refractive index of the optical element is defined at least in part by the third major surface,
wherein the optical element is deployed with one of the major surfaces of the pair of parallel major surfaces in association with one of the faces of the light-transmitting substrate such that light rays emanating from an external scene and incident to the other of the major surfaces of the pair of parallel major surfaces at a given range of incident angles are deflected at the interface region so as to be trapped within the optical element by internal reflection.

18. An optical device, comprising:
a light-transmitting substrate having at least two major surfaces for guiding light by internal reflection between the major surfaces;
an optical coupling-out configuration for coupling the light, guided by internal reflection between the two major surfaces, out of the light-transmitting substrate toward an eye of a viewer; and
an optical arrangement associated with at least one of the two major surfaces and including a pair of optical elements adjacently positioned to define an interface region associated with at least a portion of the optical coupling-out configuration, the interface region having a refractive index that is smaller than a refractive index of the optical elements, and the optical arrangement being deployed such that light rays emanating from an external scene and incident to the optical arrangement at a given range of incident angles are deflected at the interface region so as to be trapped within one of optical elements of the pair of optical elements by internal reflection.

19. The optical device of claim 1, wherein the light rays emanating from the external scene and incident to the optical arrangement at the given range of angles are deflected at the interface region so as to be trapped within the first optical element by internal reflection between the interface region and a light-entrance surface of the first optical element oblique to the interface region.

20. An optical device, comprising:
a light-transmitting substrate having at least two major surfaces for guiding light by internal reflection between the major surfaces;
an optical coupling-out configuration for coupling the light, guided by internal reflection between the two major surfaces, out of the light-transmitting substrate toward an eye of a viewer; and
an optical arrangement associated with at least one of the two major surfaces and including a first optical element and a second optical element optically coupled to the first optical element to define an interface region associated with at least a portion of the optical coupling-out configuration, the optical arrangement being deployed such that light rays emanating from an external scene and incident to the optical arrangement at a given range of incident angles are deflected at the interface region so as to be trapped within the first optical element by internal reflection, wherein the optical coupling-out configuration includes a plurality of partially reflective surfaces at least partially traversing the light-transmitting substrate, wherein the interface region spans a subset of the partially reflective surfaces located near a distal end of the light-transmitting substrate.

* * * * *